(12) United States Patent
Abdelghaffar

(10) Patent No.: US 12,127,187 B2
(45) Date of Patent: Oct. 22, 2024

(54) DOWNLINK COMMON SIGNALING IN A SINGLE FREQUENCY NETWORK TRANSMISSION SCHEME

(71) Applicant: QUALCOMM Incorporated, San Diego, CA (US)

(72) Inventor: Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/656,592

(22) Filed: Mar. 25, 2022

(65) Prior Publication Data
US 2023/0107490 A1 Apr. 6, 2023

Related U.S. Application Data

(60) Provisional application No. 63/261,984, filed on Oct. 1, 2021.

(51) Int. Cl.
*H04W 72/1263* (2023.01)
*H04W 56/00* (2009.01)
(Continued)

(52) U.S. Cl.
CPC ..... *H04W 72/1263* (2013.01); *H04W 56/001* (2013.01); *H04W 72/0453* (2013.01);
(Continued)

(58) Field of Classification Search
CPC ... H04W 72/232; H04W 72/20; H04W 72/23; H04W 72/1263; H04W 56/001; H04W 74/0833; H04W 72/0453; H04L 5/0053
See application file for complete search history.

(56) References Cited

U.S. PATENT DOCUMENTS

2022/0217634 A1* 7/2022 Sun ............... H04L 5/0051
2022/0394734 A1* 12/2022 MolavianJazi ....... H04W 72/23
(Continued)

OTHER PUBLICATIONS

Interdigital Inc: "M-TRP Operation for HST-SFN Deployment", 3GPP TSG RAN WG1 #106-e, R1-2106644, 3rd Generation Partnership Project (3GPP), Mobile Competence Centre, 650, Route Des Lucioles, F-06921 Sophia-Antipolis Cedex, France, Aug. 16, 2021-Aug. 27, 2021, Aug. 7, 2021, pp. 1-15, XP052037946, p. 3.
(Continued)

*Primary Examiner* — Chi Ho A Lee
(74) *Attorney, Agent, or Firm* — Harrity & Harrity, LLP

(57) ABSTRACT

Various aspects of the present disclosure generally relate to wireless communication. In some aspects, a user equipment (UE) may receive, from a first transmit-receive point (TRP) and a second TRP, downlink control information (DCI) with a radio network temporary identifier (RNTI) that schedules downlink common signaling. The UE may receive, from one or more of the first TRP or the second TRP based at least in part on the DCI, the downlink common signaling in a common search space (CSS) associated with a single frequency network (SFN) control resource set (CORESET) that is activated with two transmission configuration indicator (TCI) states, wherein the downlink common signaling is received from one or more of the first TRP or the second TRP based at least in part on a UE capability of an SFN transmission scheme for reception of the downlink common signaling. Numerous other aspects are described.

30 Claims, 11 Drawing Sheets

(51) Int. Cl.
*H04W 72/0453* (2023.01)
*H04W 72/20* (2023.01)
*H04W 72/23* (2023.01)
*H04W 74/0833* (2024.01)

(52) U.S. Cl.
CPC ........... *H04W 72/20* (2023.01); *H04W 72/23* (2023.01); *H04W 74/0833* (2013.01)

(56) References Cited

U.S. PATENT DOCUMENTS

| | | | | |
|---|---|---|---|---|
| 2023/0016937 A1* | 1/2023 | Jang | ........................ | H04B 7/088 |
| 2023/0198723 A1* | 6/2023 | Sun | ........................ | H04B 7/088 |
| | | | | 370/329 |
| 2023/0224726 A1* | 7/2023 | Kim | ...................... | H04L 5/0053 |
| | | | | 370/329 |
| 2023/0345498 A1* | 10/2023 | Jang | ........................ | H04L 5/0094 |
| 2023/0362898 A1* | 11/2023 | Jeon | .................. | H04W 72/0453 |
| 2023/0403759 A1* | 12/2023 | Li | ........................ | H04W 72/30 |

OTHER PUBLICATIONS

International Search Report and Written Opinion—PCT/US2022/074249—ISA/EPO—Jan. 3, 2023.

OPPO: "Enhancements on HST-SFN Deployment", 3GPP TSG RAN WG1 #106-e, R1-2107207, 3rd Generation Partnership Project (3GPP), Mobile Competence Centre, 650, Route Des Lucioles, F-06921 Sophia-Antipolis Cedex, France, Aug. 16, 2021-Aug. 27, 2021, Aug. 6, 2021, 7 Pages, XP052033487, p. 2, 5.

Qualcomm Incorporated: "Enhancements on HST-SFN deployment", 3GPP TSG-RAN WG1 Meeting #106bis-e, R1-2110169, 3rd Generation Partnership Project, Mobile Competence Centre, 650, Route Des Lucioles, F-06921 Sophia-Antipolis Cedex, France, e-Meeting, Oct. 11, 2021-Oct. 19, 2021, Oct. 2, 2021, 24 Pages, XP052059105, The Whole Document, pp. 5, 15, figures 4-1.

Qualcomm Incorporated: "Enhancements on HST-SFN Deployment", 3GPP TSG-RAN WG1 Meeting #106-e, R1-2107327, 3rd Generation Partnership Project (3GPP), Mobile Competence Centre, 650, Route Des Lucioles, F-06921 Sophia-Antipolis Cedex, France, Aug. 16, 2021-Aug. 27, 2021, Aug. 7, 2021, 48 Pages, XP052038279, p. 9, 25.

* cited by examiner

DOWNLINK COMMON SIGNALING IN A SINGLE FREQUENCY NETWORK TRANSMISSION SCHEME

CROSS-REFERENCE TO RELATED APPLICATION

This Patent Application claims priority to U.S. Provisional Patent Application No. 63/261,984, filed on Oct. 1, 2021, entitled "DOWNLINK COMMON SIGNALING IN A SINGLE FREQUENCY NETWORK TRANSMISSION SCHEME," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for downlink common signaling in a single frequency network (SFN) transmission scheme.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a first transmit-receive point (TRP) and a second TRP, downlink control information (DCI) with a radio network temporary identifier (RNTI) that schedules downlink common signaling; and receive, from one or more of the first TRP or the second TRP based at least in part on the DCI, the downlink common signaling in a common search space (CSS) associated with a single frequency network (SFN) control resource set (CORESET) that is activated or configured with two transmission configuration indicator (TCI) states, wherein the downlink common signaling is received from one or more of the first TRP or the second TRP based at least in part on a UE capability of an SFN transmission scheme for reception of the downlink common signaling.

In some implementations, an apparatus for wireless communication at a TRP includes a memory and one or more processors, coupled to the memory, configured to: transmit, to a UE, DCI with an RNTI that schedules downlink common signaling; and transmit, to the UE, the downlink common signaling in a CSS associated with an SFN CORESET that is activated or configured with two TCI states, wherein the downlink common signaling is transmitted to the UE based at least in part on a UE capability of an SFN transmission scheme for reception of the downlink common signaling.

In some implementations, a method of wireless communication performed by a UE includes receiving, from a first TRP and a second TRP, DCI with an RNTI that schedules downlink common signaling; and receiving, from one or more of the first TRP or the second TRP based at least in part on the DCI, the downlink common signaling in a CSS associated with an SFN CORESET that is activated or configured with two TCI states, wherein the downlink common signaling is received from one or more of the first TRP or the second TRP based at least in part on a UE capability of an SFN transmission scheme for reception of the downlink common signaling.

In some implementations, a method of wireless communication performed by a TRP includes transmitting, to a UE, DCI with an RNTI that schedules downlink common signaling; and transmitting, to the UE, the downlink common signaling in a CSS associated with an SFN CORESET that is activated or configured with two TCI states, wherein the downlink common signaling is transmitted to the UE based at least in part on a UE capability of an SFN transmission scheme for reception of the downlink common signaling.

In some implementations, a non-transitory computer-readable medium storing a set of instructions for wireless communication includes one or more instructions that, when executed by one or more processors of a UE, cause the UE to: receive, from a first TRP and a second TRP, DCI with an RNTI that schedules downlink common signaling; and receive, from one or more of the first TRP or the second TRP based at least in part on the DCI, the downlink common signaling in a CSS associated with an SFN CORESET that is activated or configured with two TCI states, wherein the downlink common signaling is received from one or more of the first TRP or the second TRP based at least in part on a UE capability of an SFN transmission scheme for reception of the downlink common signaling.

In some implementations, a non-transitory computer-readable medium storing a set of instructions for wireless communication includes one or more instructions that, when executed by one or more processors of a TRP, cause the TRP to: transmit, to a UE, DCI with an RNTI that schedules downlink common signaling; and transmit, to the UE, the downlink common signaling in a CSS associated with an SFN CORESET that is activated or configured with two TCI states, wherein the downlink common signaling is transmitted to the UE based at least in part on a UE capability of an SFN transmission scheme for reception of the downlink common signaling.

In some implementations, an apparatus for wireless communication includes means for receiving, from a first TRP and a second TRP, DCI with an RNTI that schedules downlink common signaling; and means for receiving, from one or more of the first TRP or the second TRP based at least in part on the DCI, the downlink common signaling in a CSS associated with an SFN CORESET that is activated or configured with two TCI states, wherein the downlink common signaling is received from one or more of the first TRP or the second TRP based at least in part on a UE capability of an SFN transmission scheme for reception of the downlink common signaling.

In some implementations, an apparatus for wireless communication includes means for transmitting, to a UE, DCI with an RNTI that schedules downlink common signaling; and means for transmitting, to the UE, the downlink common signaling in a CSS associated with an SFN CORESET that is activated or configured with two TCI states, wherein the downlink common signaling is transmitted to the UE based at least in part on a UE capability of an SFN transmission scheme for reception of the downlink common signaling.

Aspects generally include a method, apparatus, system, computer program product, non-transitory computer-readable medium, user equipment, network entity, TRP, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
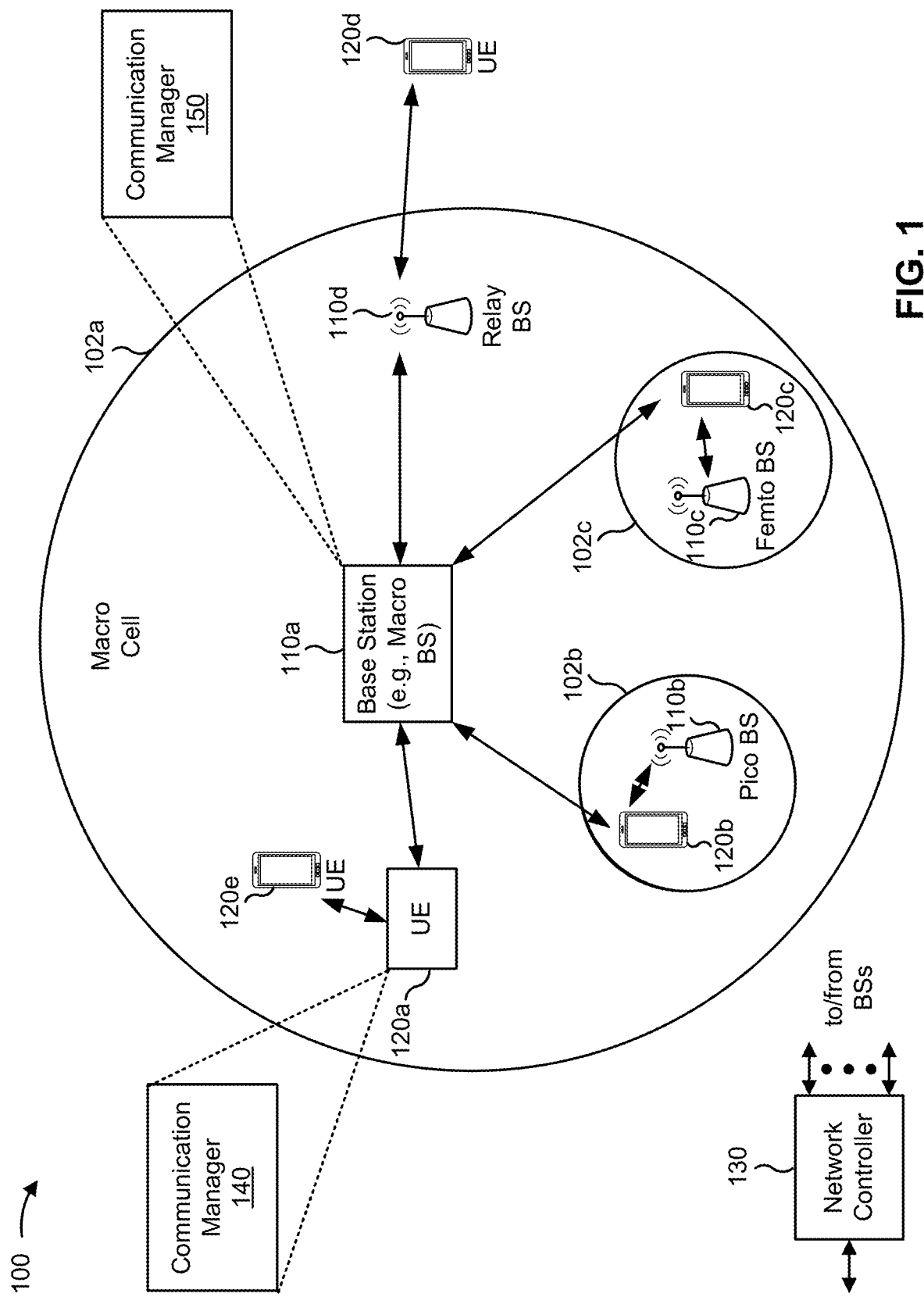
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a ULE 120*d*, and a ULE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a first transmit-receive point (TRP) and a second TRP, downlink control information (DCI) with a radio network temporary identifier (RNTI) that schedules downlink common signaling; and receive, from one or more of the first TRP or the second TRP based at least in part on the DCI, the downlink common signaling in a common search space (CSS) associated with a single frequency network (SFN) control resource set (CORESET) that is activated with two transmission configuration indicator (TCI) states, wherein the downlink common signaling is received from one or more of the first TRP or the second TRP based at least in part on a UE capability of an SFN transmission scheme for reception of the downlink common signaling. Additionally, or alternatively, the communication manager 140 may perform one or more other operations described herein.

In some aspects, a TRP (e.g., a network entity, such as base station 110) may include a communication manager 150. As described in more detail elsewhere herein, the communication manager 150 may transmit, to a UE, DCI with an RNTI that schedules downlink common signaling; and transmit, to the UE, the downlink common signaling in a CSS associated with an SFN CORESET that is activated with two TCI states, wherein the downlink common signaling is transmitted to the UE based at least in part on a UE capability of an SFN transmission scheme for reception of the downlink common signaling. Additionally, or alternatively, the communication manager 150 may perform one or more other operations described herein.

As indicated above, FIG. 1 is provided as an example. Other examples may differ from what is described with regard to FIG. 1.

Figure 2:
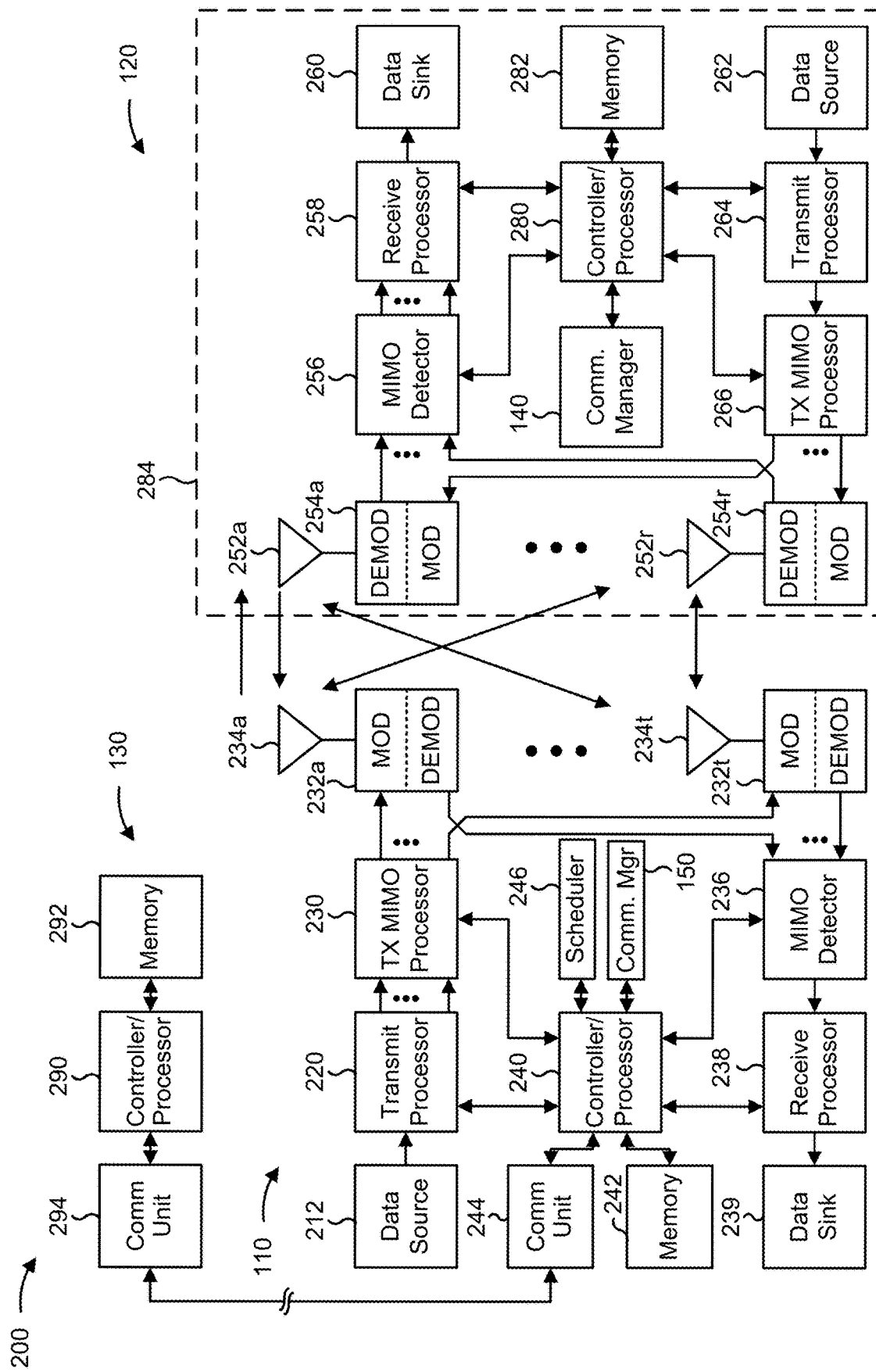
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with downlink common signaling in an SFN transmission scheme, as described in more detail elsewhere herein. In some aspects, the TRP(s) described herein are the base station 110, are included in the base station 110, or include one or more components of the base station 110 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a first TRP and a second TRP, DCI with an RNTI that schedules downlink common signaling; and/or means for receiving, from one or more of the first TRP or the second TRP based at least in part on the DCI, the downlink common signaling in a CSS associated with an SFN CORESET that is activated with two TCI states, wherein the downlink common signaling is received from one or more of the first TRP or the second TRP based at least in part on a UE capability of an SFN transmission scheme for reception of the downlink common signaling. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a TRP (e.g., a network entity, such as base station 110) includes means for transmitting, to a UE, DCI with an RNTI that schedules downlink common signaling; and/or means for transmitting, to the UE, the downlink common signaling in a CSS associated with an SFN CORESET that is activated with two TCI states, wherein the downlink common signaling is transmitted to the UE based at least in part on a UE capability of an SFN transmission scheme for reception of the downlink common signaling. The means for the TRP to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A physical downlink control channel (PDCCH) or a physical downlink shared channel (PDSCH) (PDCCH/PDSCH) transmission from a multi-TRP may be based at least in part on an SFN transmission. A same PDCCH/PDSCH transmission may be simultaneously transmitted from two TRPs using the same time and frequency recourses, which may improve a PDCCH/PDSCH reliability (e.g., in a high speed UE mobility or signal blockage scenario). In some cases, a PDCCH transmission mode may not be the same as a PDSCH transmission mode, where a PDCCH transmission may be carried from a single TRP while a PDSCH transmission may be carried in an SFN manner from both TRPs, or the PDCCH transmission may be carried in the SFN manner from both TRPs while the PDSCH transmission may be carried from a single TRP. A transmission scheme may be identified by a radio resource control (RRC) higher layer parameter, which may indicate that a PDCCH/PDSCH transmission may be transmitted in an SFN node from the two TRPs. For a PDCCH transmission, a CORESET may be activated with two transmission configuration indicator (TCI) states via a medium access control control element (MAC-CE) activation command. For a PDSCH transmission, downlink control information (DCI) format 1_1 and 1_2 may indicate a codepoint with two TCI states.

Two SFN transmission schemes may include a first SFN transmission scheme (sfnSchemeA) and a second SFN transmission scheme (sfnSchemeB). In the first SFN transmission scheme, a PDCCH/DMRS (or PDSCH/DMRS) transmission may be transmitted in an SFN manner (e.g., a same PDCCH from each TRP to achieve diversity). The DMRS of the PDCCH transmission may be associated with two TCI states to enhance a Doppler shift tracking and to enable a multi-beam reception of the PDCCH transmission (over FR2) to enhance reliability. In the first SFN transmission scheme, a first TCI state may be associated with quasi co-location (QCL) Type A and QCL Type D, and a second TCI state may be associated with QCL Type A and QCL Type D, where QCL Type A may be associated with a Doppler shift, a Doppler spread, a delay spread, and an average delay.

In the second SFN transmission scheme, the PDCCH/DMRS (or PDSCH/DMRS) transmission may be transmitted in the SFN manner. However, a PDCCH transmission of a first TRP may be frequency pre-compensated to align in frequency with a second PDCCH transmission of a second TRP. A TRP-based pre-compensation may be based at least in part on a differential Doppler shift. The DMRS of the PDCCH transmission may be linked with the two TCI states to enable the multi-beam reception of the PDCCH transmission (over FR2) to enhance reliability. In the second SFN transmission scheme, a first TCI state may be associated with QCL Type A and QCL Type D, and a second TCI state may be associated with new QCL Type, which may be associated with an average delay and a delay spread, and QCL Type D.

Figure 3:
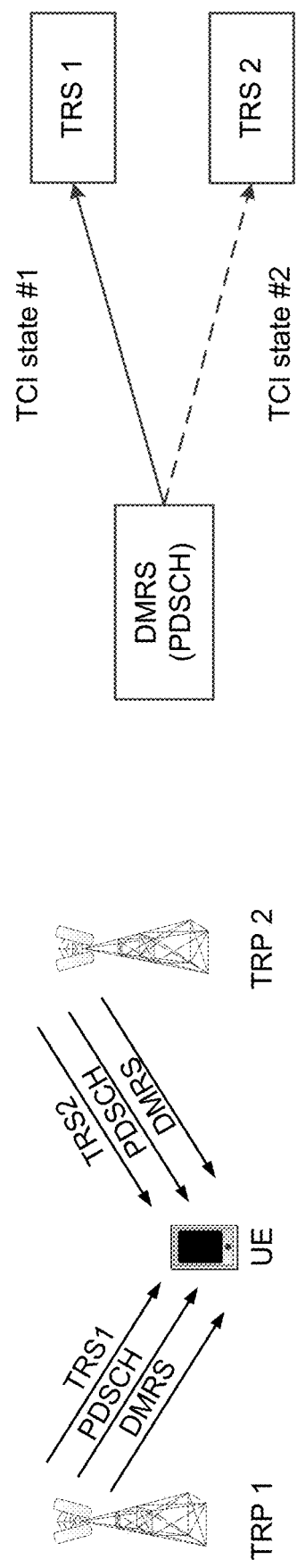
FIG. 3 is a diagram illustrating an example of single frequency network (SFN) transmission schemes, in accordance with the present disclosure.

FIG. 3 is a diagram illustrating an example 300 of single frequency network (SFN) transmission schemes, in accordance with the present disclosure.

As shown by reference number 302, a first TRP may transmit, to a UE, a first tracking reference signal (TRS), a PDCCH/PDSCH transmission, and a DMRS. A second TRP may transmit, to the UE, a second TRS, the PDCCH/PDSCH transmission, and the DMRS. The PDCCH/PDSCH transmission and the DMRS may be transmitted to the UE in an SFN manner (e.g., from each of the two TRPs), which may achieve diversity. The first TRS, the second TRS, the PDCCH/PDSCH transmission, and the DMRS may be transmitted to the UE based at least in part on a first SFN transmission scheme. In a second SFN transmission scheme, the PDCCH/PDSCH transmission from the first TRP may be pre-compensated to align in frequency with the PDCCH/PDSCH transmission from the second TRP.

As shown by reference number 304, the DMRS may be associated with a first TCI state and a second TCI state. The first TCI state may be associated with a QCL type. The second TCI state may be associated with a QCL type. The QCL type may vary for the first TCI state and the second TCI state depending on whether the first SFN transmission scheme of the second SFN transmission scheme is being used.

As indicated above, FIG. 3 is provided as an example. Other examples may differ from what is described with regard to FIG. 3.

A search space for a UE may be a common search space (CSS) or a UE-specific search space (USS). The CSS may be associated with a Type0-PDCCH, a Type0A-PDCCH, a Type1-PDCCH, a Type2-PDCCH, or a Type3-PDCCH. PDCCH candidates in the CSS may be used to schedule a PDSCH carrying broadcast information (e.g., system information block type 1 (SIB1), other system information (OSI), or paging) using a fallback DCI format 1_0. The PDCCH candidates in the CSS may be used to schedule a PDSCH carrying a message 2 (MSG2), message B (MSGB) or a message 4 (MSG4) of a random access channel (RACH) procedure. The PDCCH candidates in the CSS may be used to carry group common scheduling (DCI format 2_x), such as DCI format 2-0 for slot format indicator (SFI), a DCI format 2-1 for downlink interruption indicator, or DCI format 2-4 for an uplink cancellation indicator, etc. The CSS may be associated with SIB1 decoding, other SIB decoding, MSG2 or MSGB or MSG4 decoding, paging decoding, and/or group common or UE-specific fallback data scheduling. The USS may be associated with user-specific PDSCH decoding.

A DMRS of a PDCCH transmission may be quasi co-located with one or more reference signals using one or two TCI states, which may be configured/activated per CORESET. A single TCI state may be activated/configured per CORESET for a single TRP operation. Two TCI states may be activated for an SFN CORESET for a two-TRP operation.

TCI states (or QCL assumptions) of a PDSCH transmission scheduled by a DCI format 1_0 may be defined. For a PDCCH scrambled by a paging radio network temporary identifier (RNTI) (P-RNTI) or a system information RNTI (SI-RNTI), a scheduled PDSCH may carry broadcast information (e.g., SIB1, OSI, or paging), and a TCI/QCL assumption may indicate that the PDSCH carrying the broadcast information is quasi co-located with an associated synchronization signal (SS) or physical broadcast channel (PBCH) block with QCL Type A and QCL Type D. For a PDCCH scrambled by a random access RNTI (RA-RNTI) or a temporary cell RNTI (TC-RNTI), a scheduled PDSCH may carry MSG2 and MSG4 of the RACH procedure, and the TCI/QCL assumption may indicate that the PDSCH carrying MSG2 and MSG4 is quasi co-located with an SS/PBCH block or a channel state information reference signal (CSI-RS) resource the UE has used for a RACH association with QCL Type A and QCL Type D. When the scheduled PDSCH carries UE-specific data scheduling, the TCI/QCL assumption may indicate that a TCI field is present in DCI, scheduling CORESET TCI(s), and a TCI/QCL of a CORESET with a lowest identifier in a previous slot.

For a downlink common signaling transmission/reception in an SFN transmission scheme, a PDCCH candidate received in a CSS (Type 0/0A/1/2/3) may be associated with a CORESET that is activated with one or two TCI states. The CORESET may be an SFN CORESET or a legacy CORESET. For the SFN CORESET, the UE may not be configured to handle a PDCCH/PDSCH reception, depending on a given UE capability of SFN or non-SFN reception of common signaling. Further, the UE may not be configured to determine whether an associated SS/PBCH or a CSI-RS is transmitted from one TRP, or whether the associated SS/PBCH or the CSI-RS is transmitted from two TRPs in an SFN manner, depending on the given UE capability of SFN or non-SFN reception of common signaling. As a result, the UE may be unable to receive downlink common signaling in SFN transmission schemes.

In various aspects of techniques and apparatuses described herein, a UE may receive, from a first TRP and a second TRP, DCI with an RNTI that schedules downlink common signaling. The downlink common signaling may be a PDCCH/PDSCH transmission. The UE may receive, from the first TRP and/or the second TRP based at least in part on the DCI, the downlink common signaling in a CSS associated with an SFN CORESET. The SFN CORESET may be activated with two TCI states and an RRC parameter that indicates a first SFN transmission scheme or a second SFN transmission scheme. The first SFN transmission scheme and the second SFN transmission scheme may involve a same downlink common signaling from both the first TRP and the second TRP to achieve diversity. The UE may receive the downlink common signaling from the first TRP and/or the second TRP based at least in part on a UE capability of an SFN transmission scheme for reception of the downlink common signaling. When the UE supports the SFN transmission scheme, the UE may receive the downlink common signaling from both the first TRP and the second TRP accordingly. When the UE does not support the SFN transmission scheme, the UE may receive the downlink common signaling from only one of the first TRP or the second TRP accordingly. As a result, depending on whether or not the UE is configured to support the SFN transmission scheme, the UE may be able to receive the downlink common signaling in the CSS associated with the SFN CORESET.

Figure 4:
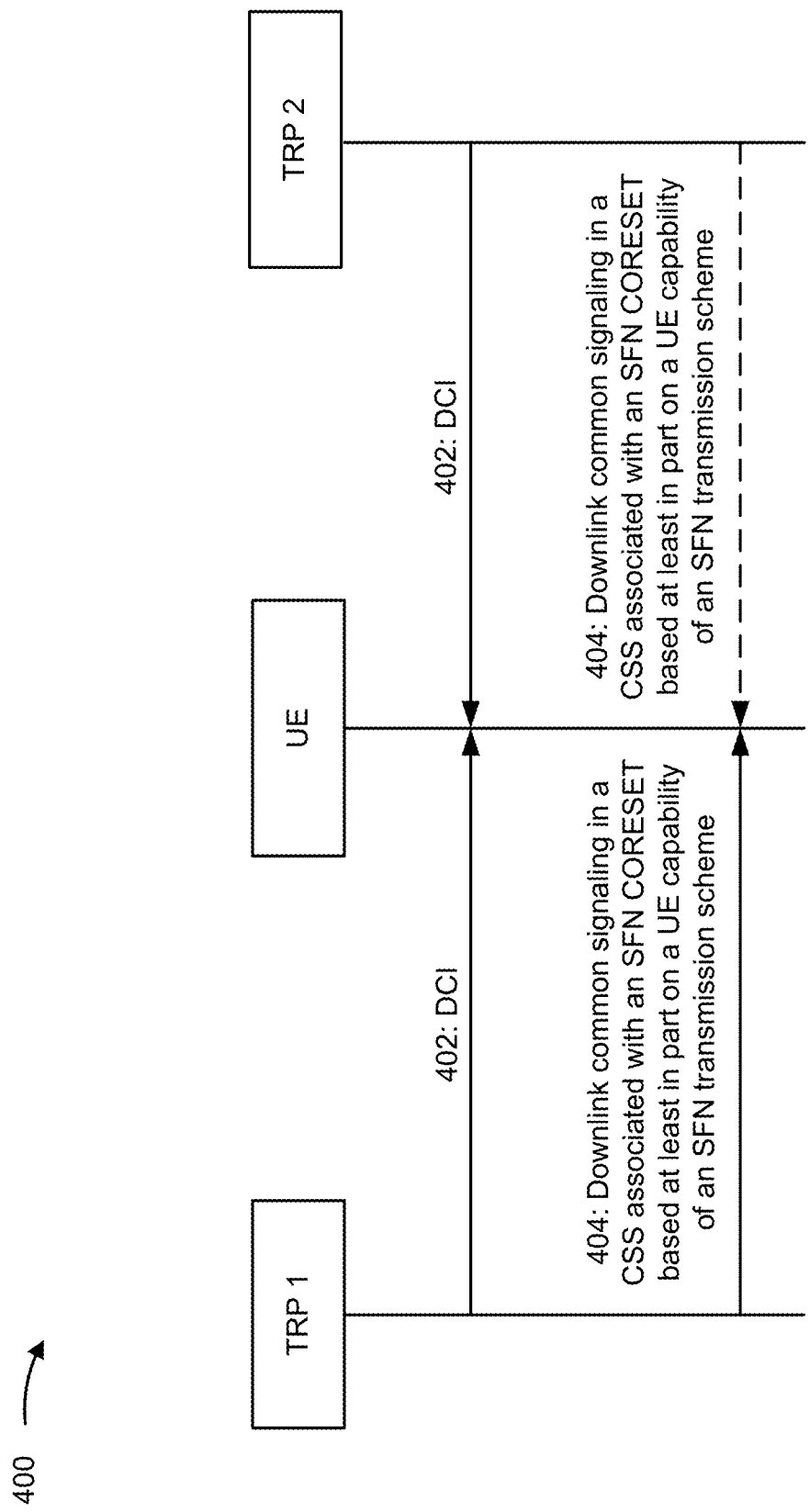
FIG. 4 is a diagram illustrating an example associated with downlink common signaling in an SFN transmission scheme, in accordance with the present disclosure.

FIG. 4 is a diagram illustrating an example 400 associated with downlink common signaling in an SFN transmission scheme, in accordance with the present disclosure. As shown in FIG. 4, example 400 includes communication between a UE (e.g., UE 120), a first TRP (e.g., a network entity, such as base station 110), and a second TRP (e.g., a network entity, such as base station 110). In some aspects, the UE, the first TRP, and the second TRP may be included in a wireless network, such as wireless network 100.

As shown by reference number 402, the UE may receive, from the first TRP and the second TRP, DCI with an RNTI that schedules or carries downlink common signaling. The downlink common signaling may be a PDCCH/PDSCH transmission. The RNTI may be an SI-RNTI, a P-RNTI, an RA-RNTI, a TC-RNTI, or another suitable RNTI. The common signaling may include broadcast information, system information, paging messages, random-access messages, or group-common control messages.

As shown by reference number 404, the UE may receive, from the first TRP and/or the second TRP based at least in part on the DCI, the downlink common signaling in a CSS associated with an SFN CORESET. The SFN CORESET refers to a CORESET that is activated or configured with two TCI states for SFN transmission and an RRC parameter that indicates a first SFN transmission scheme or a second SFN transmission scheme. The downlink common signaling may be received from the first TRP and/or the second TRP based at least in part on a UE capability of an SFN transmission scheme for reception of the downlink common signaling.

In some aspects, the second SFN transmission scheme may not be applicable to the downlink common signaling based at least in part on a frequency pre-compensation associated with the second SFN transmission scheme and different frequencies associated with different UEs.

In some aspects, the downlink common signaling may be associated with a PDCCH, the CSS may be a CSS type 0/0A/2, the RNTI may be the SI-RNTI or the P-RNTI, and the DCI may schedule a PDSCH for a SIB, OSI or paging. In some aspects, the UE capability may indicate, based at least in part on a UE capability report, that the UE does not support an SFN PDCCH reception in the CSS type 0/0A/2, and the UE may receive the downlink common signaling based at least in part on an assumption of a single TRP PDCCH transmission with a single TCI state. In some aspects, the UE capability may indicate that the UE supports the SFN PDCCH reception in the CSS type 0/0A/2, and the UE may receive the downlink common signaling based at least in part on an assumption of an SFN PDCCH transmission with two TCI states of the SFN CORESET, as indicated by the UE capability report.

In some aspects, a PDCCH reception may occur in the CSS type 0/0A/2 with a fallback DCI format 1_0 with the SI-RNTI or the P-RNTI. The fallback DCI format 1_0 may schedule a PDSCH for SIB1, OSI, or paging. In other words, the DCI format 1_0 may refer to a DCI format 1_0 with the SI-RNTI carrying scheduling information for SIB1/OSI, or DCI format 1_0 with the P-RNTI for paging. The CSS type 0/0A/2 may be associated with an SFN CORESET. The SFN CORESET may be a CORESET activated with two TCI states and an RRC parameter that indicates sfnSchemeA or sfnSchemeB.

In some aspects, when the UE does not support an SFN PDCCH reception in CSS type 0/0A/2, the UE may assume a single TRP PDCCH transmission with a single TCI state based at least in part on a predefined rule. For example, the single TCI state may be based at least in part on a first or second TCI state, a lowest/highest TCI identifier, or a TCI state with QCL Type-A, based at least in part on the predefined rule. For a USS associated with that SFN CORESET, the UE may assume an SFN PDCCH reception. In some aspects, when the UE supports only SFN PDCCH reception, the UE may not expect to be configured with a CSS type 0/0A/2 that is associated with a single TCI CORESET. In some aspects, sfnSchemeB may not be applicable to common signaling, since sfnSchemeB may involve frequency pre-compensation and different UEs may be associated with different frequencies.

In some aspects, the SFN CORESET may be associated with the CSS type 0/0A/2 and the USS. When the UE supports an SFN PDCCH in CSS type 0/0A/2, the UE may assume an SFN PDCCH with the two TCI states of the SFN CORESET for both the CSS type 0/0A/2 and the USS. The UE may assume the SFN PDCCH with the two TCI states of the SFN CORESET based at least in part on a UE capability report of SFN. When the UE assumes a single TRP PDCCH, the UE may select only one TCI state of the SFN CORESET. When the UE does not support an SFN PDCCH in CSS type 0/0A/2, the UE may assume a single TRP (sTRP) PDCCH with one TCI state for the CSS type 0/0A/2 and an SFN-PDCCH with the two TCI states of the SFN CORESET for the USS.

In some aspects, the downlink common signaling may be associated with a PDCCH, the CSS may be a CSS type 1, the RNTI may be the RA-RNTI or the TC-RNTI, and the DCI may schedule MSG2 or MSG4 of a RACH procedure. In some aspects, the UE capability may indicate, based at least in part on a UE capability report, that the UE does not support an SFN PDCCH reception in the CSS type 1, and the UE may receive the downlink common signaling based at least in part on an assumption of a single TRP PDCCH transmission with a single TCI state. In some aspects, the UE capability may indicate that the UE supports the SFN PDCCH reception in the CSS type 1, and the UE may receive the downlink common signaling based at least in part on an assumption of an SFN PDCCH transmission with two TCI states of the SFN CORESET, as indicated by the UE capability report.

In some aspects, a PDCCH reception may occur in the CSS type 1 with a fallback DCI format 1_0 with the RA-RNTI or the TC-RNTI. The fallback DCI format 1_0 may schedule a MSG2/MSG4 for a RACH procedure. In other words, the DCI format 1_0 may refer to a DCI format 1_0 with the RA-RNTI carrying scheduling information for MSG2, or a DCI format 1_0 with the TC-RNTI for allocating resources for MSG4. The CSS type 1 may be associated with an SFN CORESET. The SFN CORESET may be a CORESET activated with two TCI states and an RRC parameter that indicates sfnSchemeA or sfnSchemeB.

In some aspects, when the UE does not support an SFN PDCCH reception in CSS type 1, the UE may assume a single TRP PDCCH transmission with a single TCI state based at least in part on a predefined rule. For example, the single TCI state may be based at least in part on a first or second TCI state, a lowest/highest TCI identifier, or a TCI state with QCL Type-A, based at least in part on the predefined rule. For a USS associated with that SFN CORESET, the UE may assume an SFN PDCCH reception that is associated with a single TCI CORESET. In some aspects, when the UE supports only SFN PDCCH reception, the UE may not expect to be configured with a CSS type 1 that is associated with the single TCI CORESET. In some aspects, sfnSchemeB may not be applicable to common signaling, since sfnSchemeB may involve frequency pre-compensation and different UEs may be associated with different frequencies. In addition, some UEs may not support SFN schemes.

In some aspects, the SFN CORESET may be associated with the CSS type 1 and the USS. When the UE supports an SFN PDCCH in CSS type 1, the UE may assume an SFN PDCCH with the two TCI states of the SFN CORESET for both the CSS type 1 and the USS. The UE may assume the SFN PDCCH with the two TCI states of the SFN CORESET based at least in part on the UE capability report of SFN. When the UE assumes a single TRP PDCCH, the UE may select only one TCI state of the SFN CORESET. When the UE does not support an SFN PDCCH in CSS type 0/0A/2, the UE may assume an sTRP PDCCH with one TCI state for the CSS type 1 and an SFN-PDCCH with the two TCI states of the SFN CORESET for the USS.

In some aspects, the downlink common signaling may be associated with a PDCCH, the CSS may be a CSS type 3, and the DCI may schedule a UE group common (GC)-PDCCH. In some aspects, the UE capability may indicate that the UE does not support an SFN GC-PDCCH reception in the CSS type 3, and the UE may receive the downlink common signaling based at least in part on an assumption of a single TRP PDCCH transmission with a single TCI state. In some aspects, the UE capability may indicate that the UE supports the SFN GC-PDCCH reception in the CSS type 3, and the UE may receive the downlink common signaling based at least in part on an assumption of an SFN PDCCH transmission with two TCI states of the SFN CORESET.

In some aspects, a PDCCH reception may occur in a CSS type 3 with a DCI format 2-x for group common signaling. The DCI format 2-x may be associated with a GC-PDCCH reception. The DCI format 2_x may refer to a DCI format 2_0 with a slot format indication (SFI)-RNTI, a DCI format 2_1 with an interruption (INT)-RNTI, a DCI format 2_2 with a transmit power control (TPC)-PUCCH-RNTI or a TPC physical uplink shared channel (PUSCH)-RNTI, a DCI format 2-3 with a TPC sounding reference signal RNTI (TPC-SRS-RNTI), or a DCI format 2-4. The CSS type 3 may be associated with an SFN CORESET. The SFN CORESET may be a CORESET activated with two TCI states and an RRC parameter that indicates sfnSchemeA or sfnSchemeB.

In some aspects, when the UE does not support an SFN PDCCH reception in CSS type 3, the UE may assume a single TRP PDCCH transmission with a single TCI state based at least in part on a predefined rule. For example, the single TCI state may be based at least in part on a first or second TCI state, a lowest/highest TCI identifier, or a TCI state with QCL Type-A, based at least in part on the predefined rule. For a USS associated with that SFN CORESET, the UE may assume an SFN PDCCH reception. In some aspects, when the UE supports only SFN PDCCH reception, the UE may not expect to be configured with a CSS type 3 that is associated with a single TCI CORESET. In some aspects, sfnSchemeB may not be applicable to common signaling, since sfnSchemeB may involve frequency pre-compensation and different UEs may be associated with different frequencies.

In some aspects, the SFN CORESET may be associated with the CSS type 3 and the USS. When the UE supports an SFN GC-PDCCH, the UE may assume an SFN PDCCH with the two TCI states of the SFN CORESET for both the CSS type 3 and the USS. When the UE does not support an SFN GC-PDCCH, the UE may assume an sTRP PDCCH with one TCI state for the CSS type 3 and an SFN-PDCCH with the two TCI states of the SFN CORESET for the USS.

In some aspects, the downlink common signaling may be associated with a PDCCH, and the RNTI may be the SI-RNTI, the P-RNTI, the RA-RNTI, or the TC-RNTI. The UE may receive, from the first TRP and/or the second TRP, a synchronization signal block (SSB) or a CSI-RS based at least in part on the UE capability of the SFN transmission scheme. In some aspects, the UE may receive the SSB from both the first TRP and the second TRP based at least in part on the UE capability supporting the SFN transmission scheme. In some aspects, the UE may receive the SSB or the CSI-RS from the first TRP and/or the second TRP based at least in part on the UE capability of not supporting the SFN transmission scheme, where the first TRP or the second TRP may be mapped to a single TCI state of the SFN CORESET. In some aspects, the UE may receive a pair of SSBs or a pair of CSI-RSs, where a first SSB/CSI-RS may be received from the first TRP and a second SSB/CSI-RS may be received from the second TRP based at least in part on the UE capability supporting the SFN transmission scheme associated with the pair of SSBs/CSI-RSs.

As indicated above, FIG. 4 is provided as an example. Other examples may differ from what is described with regard to FIG. 4.

Figure 5:
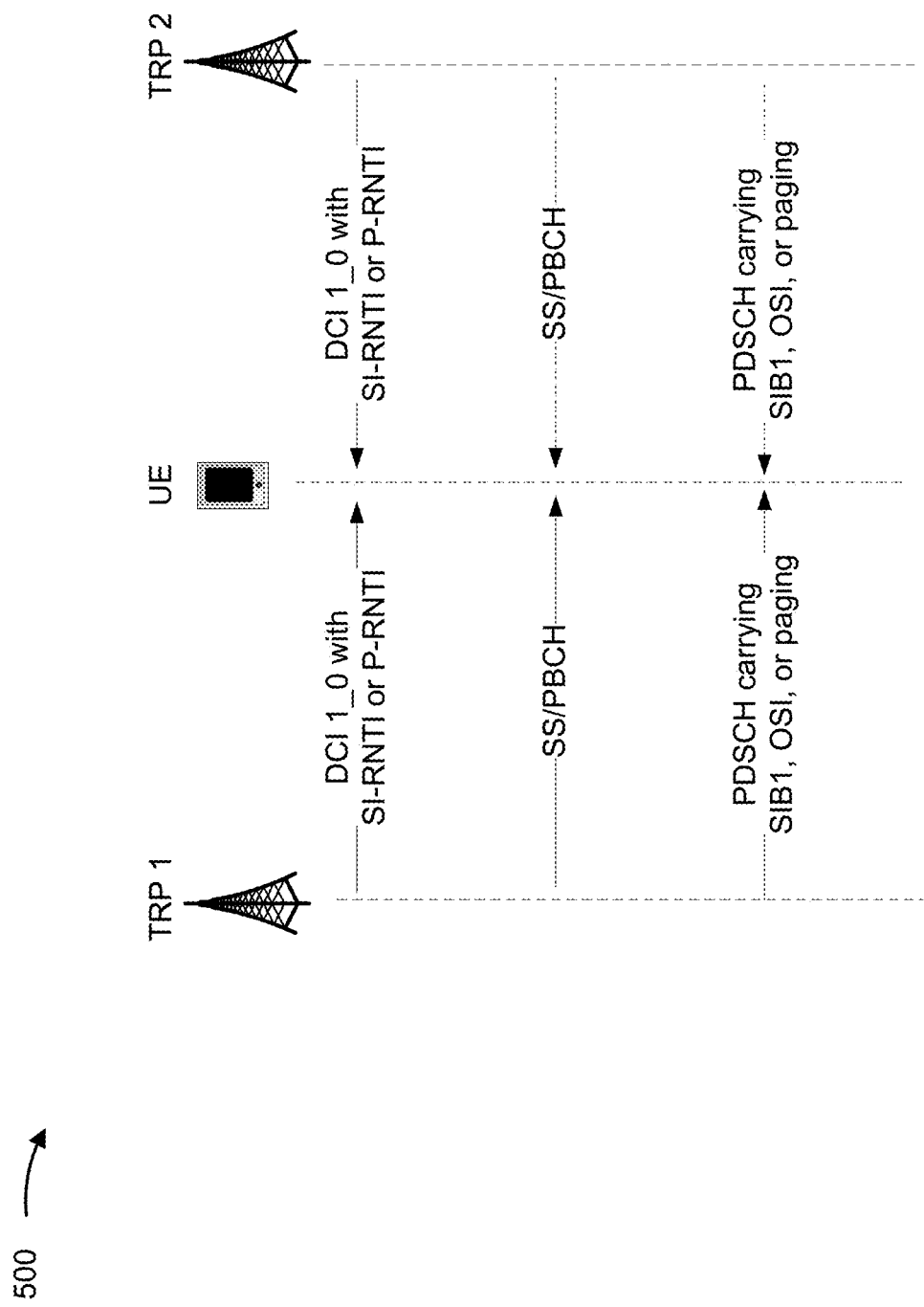
FIGS. 5-6 are diagrams illustrating examples associated with assumptions at a UE regarding a transmission of a synchronization signal (SS) or physical broadcast channel (PBCH), in accordance with the present disclosure.

FIG. 5 is a diagram illustrating an example 500 associated with assumptions at a UE regarding a transmission of an SS/PBCH, in accordance with the present disclosure.

As shown in FIG. 5, a UE may receive a fallback DCI format 1_0 with an SI-RNTI or a P-RNTI from each of a first TRP and a second TRP. The UE may receive an SS/PBCH from each of the first TRP and the second TRP, or the UE may only receive the SS/PBCH from one of the TRPs (e.g., the first TRP, which may be an anchor TRP). The UE may receive a PDSCH carrying a SIB1, OSI, or paging from each of the first TRP and the second TRP, or the UE may only receive the PDSCH carrying the SIB1, OSI, or paging from one of the TRPs (e.g., the first TRP).

In some aspects, for an SFN PDCCH with the fallback DCI 1_0 scrambled with the SI-RNTI or the P-RNTI, the UE may assume that an SS/PBCH is transmitted. In some aspects, a transparent SFN transmission scheme by both TRPs may result in a same SSB being transmitted from both TRPs. In this case, the SSB may be an SFN SSB, which may include the SS/PBCH. When the UE supports multiple panels or a dual beam reception, the UE may receive the SSB using the dual beam reception. In some aspects, in a TRP-specific (TRP 1 or TRP 2) scenario, an SSB may only be transmitted from one TRP, such as an anchor TRP. The anchor TRP may be identified by a TRP mapped to a first TCI state (or second TCI state) of an SFN CORESET, or a TCI with QCL Type-A. In some aspects, when the UE does not support the SFN PDCCH, the UE may assume that the SSB is transmitted from one TRP. In some aspects, two SSBs (or pair of SSBs, e.g. SSB1 and SSB2) may be sent from the two TRPs and may be associated with the SFN PDSCH transmission.

As indicated above, FIG. 5 is provided as an example. Other examples may differ from what is described with regard to FIG. 5.

Figure 6:
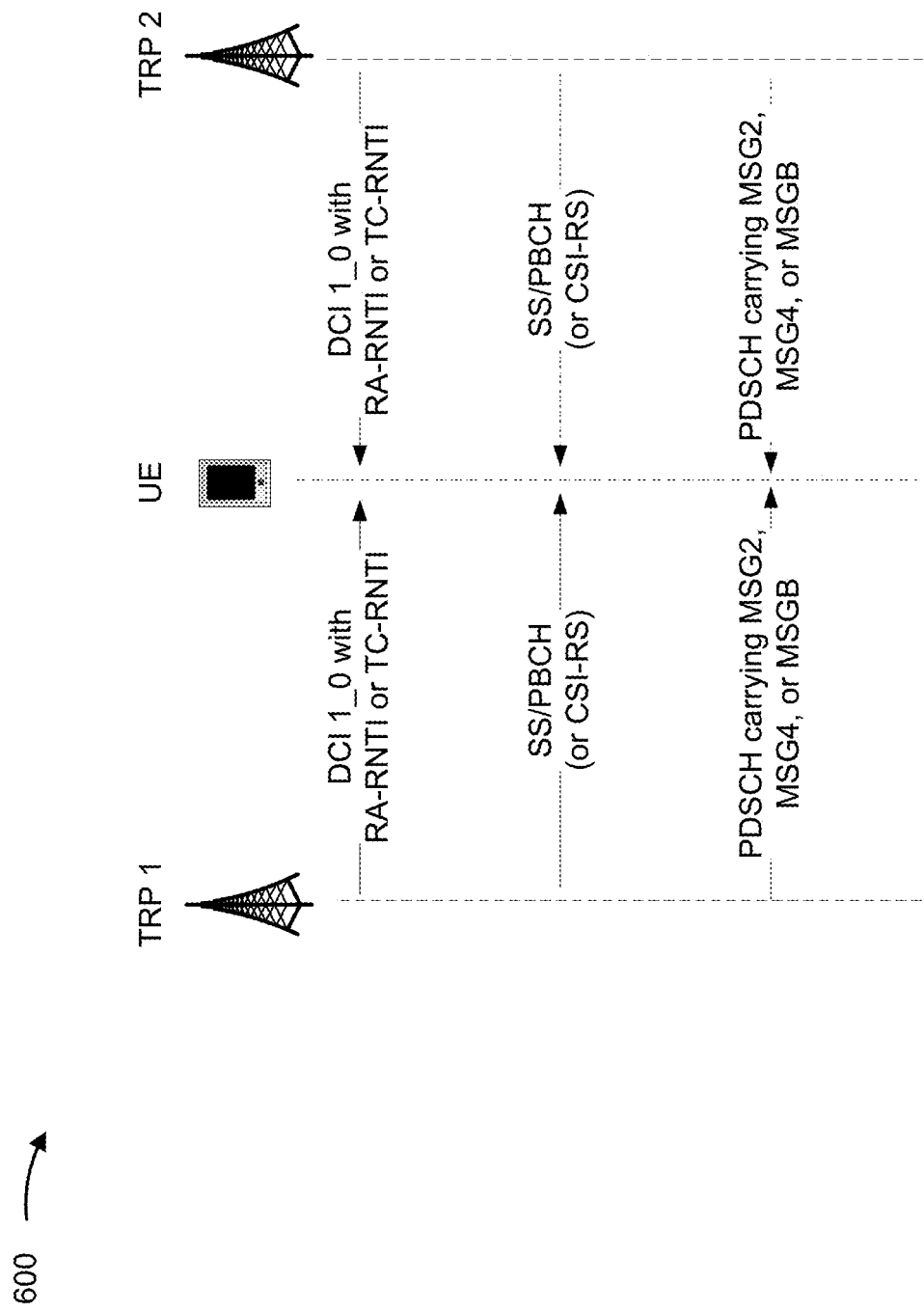

FIG. 6 is a diagram illustrating an example 600 associated with assumptions at a UE regarding a transmission of an SS/PBCH, in accordance with the present disclosure.

As shown in FIG. 6, a UE may receive a fallback DCI format 1_0 with an RA-RNTI or a TC-RNTI or a MSGB-RNTI from each of a first TRP and a second TRP or from only one TRP. The UE may receive an SS/PBCH from each of the first TRP and the second TRP, or the UE may only receive the SS/PBCH from one of the TRPs (e.g., the first TRP, which may be an anchor TRP). The UE may receive an SS/PBCH from the first TRP and another SS/PBCH from the second TRP. The UE may receive a PDSCH carrying MSG2 or MSG4 of a RACH procedure from each of the first TRP and the second TRP, or the UE may only receive the PDSCH carrying MSG2 or MSG4 of the RACH procedure from one of the TRPs (e.g., the first TRP).

In some aspects, for an SFN PDCCH with the fallback DCI 1_0 scrambled with the RA-RNTI or the TC-RNTI, the UE may assume that an SS/PBCH or a CSI-RS is transmitted. In some aspects, a transparent SFN transmission scheme by both TRPs may result in a same SSB being transmitted from both TRPs. In this case, the SSB may be an SFN SSB, which may include the SS/PBCH. When the UE supports multiple panels or a dual beam reception, the UE may receive the SSB using the dual beam reception. In some aspects, in a TRP-specific (TRP 1 or TRP 2) scenario, an SSB/CSI-RS may only be transmitted from one TRP, such as an anchor TRP. The anchor TRP may be identified by a TRP mapped to a first TCI state (or second TCI state) of an SFN CORESET, or a TCI with QCL Type-A. In some aspects, when the UE does not support the SFN PDCCH, the UE may assume that the SSB/CSI-RS is transmitted from one TRP.

As indicated above, FIG. 6 is provided as an example. Other examples may differ from what is described with regard to FIG. 6.

In some aspects, the downlink common signaling may be associated with a PDSCH and an RNTI associated with the PDSCH may be an SI-RNTI or a P-RNTI. The UE may receive the downlink common signaling based at least in part on: an assumption that the PDSCH is transmitted by both the first TRP and the second TRP in accordance with a SFN transmission scheme, and an assumption that a DMRS port of the PDSCH is quasi co-located with an associated SFN SSB or pair of SSBs, with respect to one or more of a Doppler shift, a Doppler spread, an average delay, a delay spread, or spatial receive parameters associated with each of the first TRP and the second TRP.

In some aspects, regarding an assumption of a PDSCH reception at a UE that supports SFN PDSCH reception or does not support SFN PDSCH reception, the UE may receive a PDSCH scheduled with the SI-RNTI or the P-RNTI, such that the PDSCH may carry system information or paging. When receiving the PDSCH scheduled with the SI-RNTI or the P-RNTI, the UE may assume that the PDSCH is transmitted from both TRPs in the SFN transmission scheme and that the DMRS port of the PDSCH is quasi co-located with an associated SFN SS/PBCH block or pair of SSBs, with respect to the Doppler shift, the Doppler spread, the average delay, the delay spread, and/or the spatial receive (Rx) parameters from each TRP.

In some aspects, the downlink common signaling may be associated with a PDSCH, and the RNTI associated with the PDSCH may be an RA-RNTI or a Message B (MsgB) RNTI. The UE may receive the downlink common signaling based at least in part on: an assumption that the PDSCH is transmitted by both the first TRP and the second TRP in accordance with the SFN transmission scheme, and an assumption that the DMRS port of the PDSCH is quasi co-located with the associated SFN SSB or an SFN CSI-RS resource or a pair of SSBs or a pair of CSI-RSs resources that the UE used for a RACH transmission, with respect to one or more of the Doppler shift, the Doppler spread, the average delay, the delay spread, or the spatial receive parameters associated with each of the first TRP and the second TRP.

In some aspects, when receiving a PDSCH scheduled with the RA-RNTI or the MsgB RNTI (MSGB-RNTI) (which may be associated with a MsgB reception), such that the PDSCH may carry MSG2, the UE may assume that the PDSCH is transmitted from both TRPs in the SFN transmission scheme. The UE may assume that the DMRS port of the PDSCH is quasi co-located with the SFN SS/PBCH block or the SFN CSI-RS resource or pair or reference signals the UE used for a RACH association (as applicable) and transmission, with respect to the Doppler shift, the Doppler spread, the average delay, the delay spread, and/or the spatial Rx parameters from each TRP.

In some aspects, when receiving the downlink common signaling, the UE may receive a PDSCH based at least in part on a PUSCH transmission scheduled by a random access response (RAR) uplink grant or a corresponding PUSCH retransmission. The UE may receive a PDSCH based at least in part on a PUSCH for a Type-2 random access procedure, or a PUSCH scheduled by a fallback RAR uplink grant or a corresponding PUSCH retransmission. The UE may receive the downlink common signaling based at least in part on: an assumption that the PDSCH is transmitted by both the first TRP and the second TRP in accordance with the SFN transmission scheme, and an assumption that a DMRS port of the PDSCH is quasi co-located with an associated SFN SSB or a pair of SSBs the UE used for a RACH transmission, with respect to one or more of the Doppler shift, the Doppler spread, the average delay, the delay spread, or the spatial receive parameters associated with each of the first TRP and the second TRP.

In some aspects, when receiving the PDSCH in response to the PUSCH transmission scheduled by the RAR uplink grant or the corresponding PUSCH retransmission, or when receiving the PDSCH in response to the PUSCH for the Type-2 random access procedure, or the PUSCH scheduled by the fallback RAR uplink grant or the corresponding PUSCH retransmission, such that the PDSCH may carry MSG4, the UE may assume that the PDSCH is transmitted from both TRPs in the SFN transmission scheme. The UE may assume that the DMRS port of the PDSCH is quasi co-located with the SFN SS/PBCH block or pair of SS/PBCH blocks the UE selected for the RACH association and transmission, with respect to the Doppler shift, the Doppler spread, the average delay, the delay spread, and/or the spatial Rx parameters from each TRP.

Figure 7:
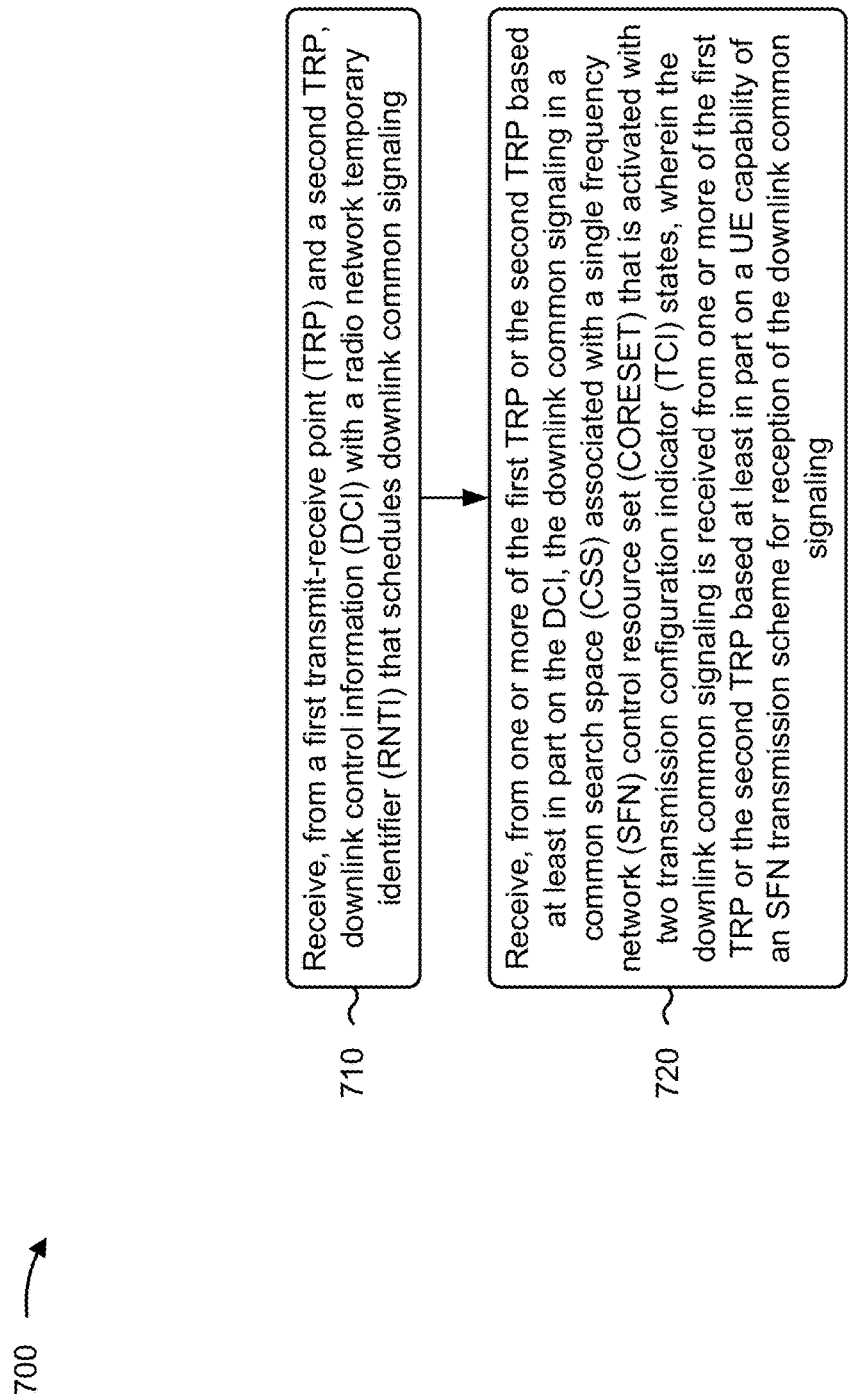
FIGS. 7-8 are diagrams illustrating example processes associated with downlink common signaling in an SFN transmission scheme, in accordance with the present disclosure.

FIG. 7 is a diagram illustrating an example process 700 performed, for example, by a user equipment (UE), in accordance with the present disclosure. Example process 700 is an example where the UE (e.g., UE 120) performs operations associated with downlink common signaling in an SFN transmission scheme.

As shown in FIG. 7, in some aspects, process 700 may include receiving, from a first TRP and a second TRP, DCI with an RNTI that schedules downlink common signaling (block 710). For example, the UE (e.g., using communication manager 140 and/or reception component 902, depicted in FIG. 9) may receive, from a first TRP and a second TRP, DCI with an RNTI that schedules downlink common signaling, as described above in connection with FIGS. 4-6.

As further shown in FIG. 7, in some aspects, process 700 may include receiving, from one or more of the first TRP or the second TRP based at least in part on the DCI, the downlink common signaling in a CSS associated with an SFN CORESET that is activated with two TCI states, wherein the downlink common signaling is received from one or more of the first TRP or the second TRP based at least in part on a UE capability of an SFN transmission scheme for reception of the downlink common signaling (block 720). For example, the UE (e.g., using communication manager 140 and/or reception component 902, depicted in FIG. 9) may receive, from one or more of the first TRP or the second TRP based at least in part on the DCI, the downlink common signaling in a CSS associated with an SFN CORESET that is activated with two TCI states, wherein the downlink common signaling is received from one or more of the first TRP or the second TRP based at least in part on a UE capability of an SFN transmission scheme for reception of the downlink common signaling, as described above in connection with FIGS. 4-6.

Process 700 may include additional aspects, such as any single aspect or any combination of aspects described below and/or in connection with one or more other processes described elsewhere herein.

In a first aspect, the SFN CORESET is associated with an RRC parameter that indicates a first SFN transmission scheme or a second SFN transmission scheme.

In a second aspect, alone or in combination with the first aspect, the second SFN transmission scheme is not applicable to the downlink common signaling based at least in part on a frequency pre-compensation associated with the second SFN transmission scheme and different frequencies associated with different UEs.

In a third aspect, alone or in combination with one or more of the first and second aspects, the downlink common signaling is associated with a PDCCH, the CSS is a CSS type 0/0A/2, the RNTI is an SI-RNTI or a P-RNTI, and the DCI schedules a PDSCH for a SIB or paging.

In a fourth aspect, alone or in combination with one or more of the first through third aspects, the UE capability indicates that the UE does not support an SFN PDCCH reception in the CSS type 0/0A/2, and receiving the downlink common signaling is based at least in part on an assumption of a single TRP PDCCH transmission with a single TCI state.

In a fifth aspect, alone or in combination with one or more of the first through fourth aspects, the UE capability indicates that the UE supports the SFN PDCCH reception in the CSS type 0/0A/2, and receiving the downlink common signaling is based at least in part on an assumption of an SFN PDCCH transmission with the two TCI states of the SFN CORESET.

In a sixth aspect, alone or in combination with one or more of the first through fifth aspects, the downlink common signaling is associated with a PDCCH, the CSS is a CSS type 1, the RNTI is an RA-RNTI or a TC-RNTI, and the DCI schedules a Message 2 or a Message 4 of a RACH procedure.

In a seventh aspect, alone or in combination with one or more of the first through sixth aspects, the UE capability indicates that the UE does not support an SFN PDCCH reception in the CSS type 1, and receiving the downlink common signaling is based at least in part on an assumption of a single TRP PDCCH transmission with a single TCI state.

In an eighth aspect, alone or in combination with one or more of the first through seventh aspects, the UE capability indicates that the UE supports the SFN PDCCH reception in the CSS type 1, and receiving the downlink common signaling is based at least in part on an assumption of an SFN PDCCH transmission with the two TCI states of the SFN CORESET.

In a ninth aspect, alone or in combination with one or more of the first through eighth aspects, the downlink common signaling is associated with a PDCCH, the CSS is a CSS type 3, and the DCI schedules a UE GC-PDCCH.

In a tenth aspect, alone or in combination with one or more of the first through ninth aspects, the UE capability indicates that the UE does not support an SFN GC-PDCCH reception in the CSS type 3, and receiving the downlink common signaling is based at least in part on an assumption of a single TRP PDCCH transmission with a single TCI state.

In an eleventh aspect, alone or in combination with one or more of the first through tenth aspects, the UE capability indicates that the UE supports the SFN GC-PDCCH reception in the CSS type 3, and receiving the downlink common signaling is based at least in part on an assumption of an SFN PDCCH transmission with the two TCI states of the SFN CORESET.

In a twelfth aspect, alone or in combination with one or more of the first through eleventh aspects, the downlink common signaling is associated with a PDCCH, and the RNTI is an SI-RNTI, a P-RNTI, an RA-RNTI, or a TC-RNTI, and process 700 includes receiving, from one or more of the first TRP or the second TRP, an SSB or a CSI-RS based at least in part on the UE capability of the SFN transmission scheme.

In a thirteenth aspect, alone or in combination with one or more of the first through twelfth aspects, process 700 includes receiving the SSB from both the first TRP and the second TRP based at least in part on the UE capability supporting the SFN transmission scheme.

In a fourteenth aspect, alone or in combination with one or more of the first through thirteenth aspects, process 700 includes receiving the SSB or a CSI-RS from the first TRP or the second TRP based at least in part on the UE capability of not supporting the SFN transmission scheme, wherein the first TRP or the second TRP is mapped to a single TCI state of the SFN CORESET.

In a fifteenth aspect, alone or in combination with one or more of the first through fourteenth aspects, process 700 includes receiving a pair of SSBs or a pair of CSI-RSs, wherein a first SSB or a first CSI-RS is received from the first TRP and a second SSB or a second CSI-RS is received from the second TRP based at least in part on the UE capability supporting the SFN transmission scheme associated with the pair of SSBs or the pair of CSI-RSs.

In a sixteenth aspect, alone or in combination with one or more of the first through fifteenth aspects, the downlink common signaling is associated with a PDSCH, and the RNTI is an SI-RNTI or a P-RNTI, and receiving the downlink common signaling is based at least in part on an assumption that the PDSCH is transmitted by both the first TRP and the second TRP in accordance with the SFN transmission scheme, and an assumption that a DMRS port of the PDSCH is quasi co-located with an associated SFN SSB or pair of SSBs, with respect to one or more of a Doppler shift, a Doppler spread, an average delay, a delay spread, or spatial receive parameters associated with each of the first TRP and the second TRP.

In a seventeenth aspect, alone or in combination with one or more of the first through sixteenth aspects, the downlink common signaling is associated with a PDSCH, and the RNTI is a random access RNTI or a Message B RNTI, and receiving the downlink common signaling is based at least in part on an assumption that the PDSCH is transmitted by both the first TRP and the second TRP in accordance with the SFN transmission scheme, and an assumption that a DMRS port of the PDSCH is quasi co-located with an associated SFN SSB or an SFN CSI-RS resource or a pair of SSBs or a pair of CSI-RSs resources that the UE used for a RACH transmission, with respect to one or more of a Doppler shift, a Doppler spread, an average delay, a delay spread, or spatial receive parameters associated with each of the first TRP and the second TRP.

In an eighteenth aspect, alone or in combination with one or more of the first through seventeenth aspects, process 700 includes receiving a PDSCH based at least in part on a PUSCH transmission scheduled by a RAR uplink grant or a corresponding PUSCH retransmission, or receiving a PDSCH based at least in part on a PUSCH for a Type-2 random access procedure, or a PUSCH scheduled by a fallback RAR uplink grant or a corresponding PUSCH retransmission.

In a nineteenth aspect, alone or in combination with one or more of the first through eighteenth aspects, receiving the downlink common signaling is based at least in part on an assumption that the PDSCH is transmitted by both the first TRP and the second TRP in accordance with the SFN transmission scheme, and an assumption that a DMRS port of the PDSCH is quasi co-located with an associated SFN SSB or a pair of SSBs that the UE used for a RACH transmission, with respect to one or more of a Doppler shift, a Doppler spread, an average delay, a delay spread, or spatial receive parameters associated with each of the first TRP and the second TRP.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
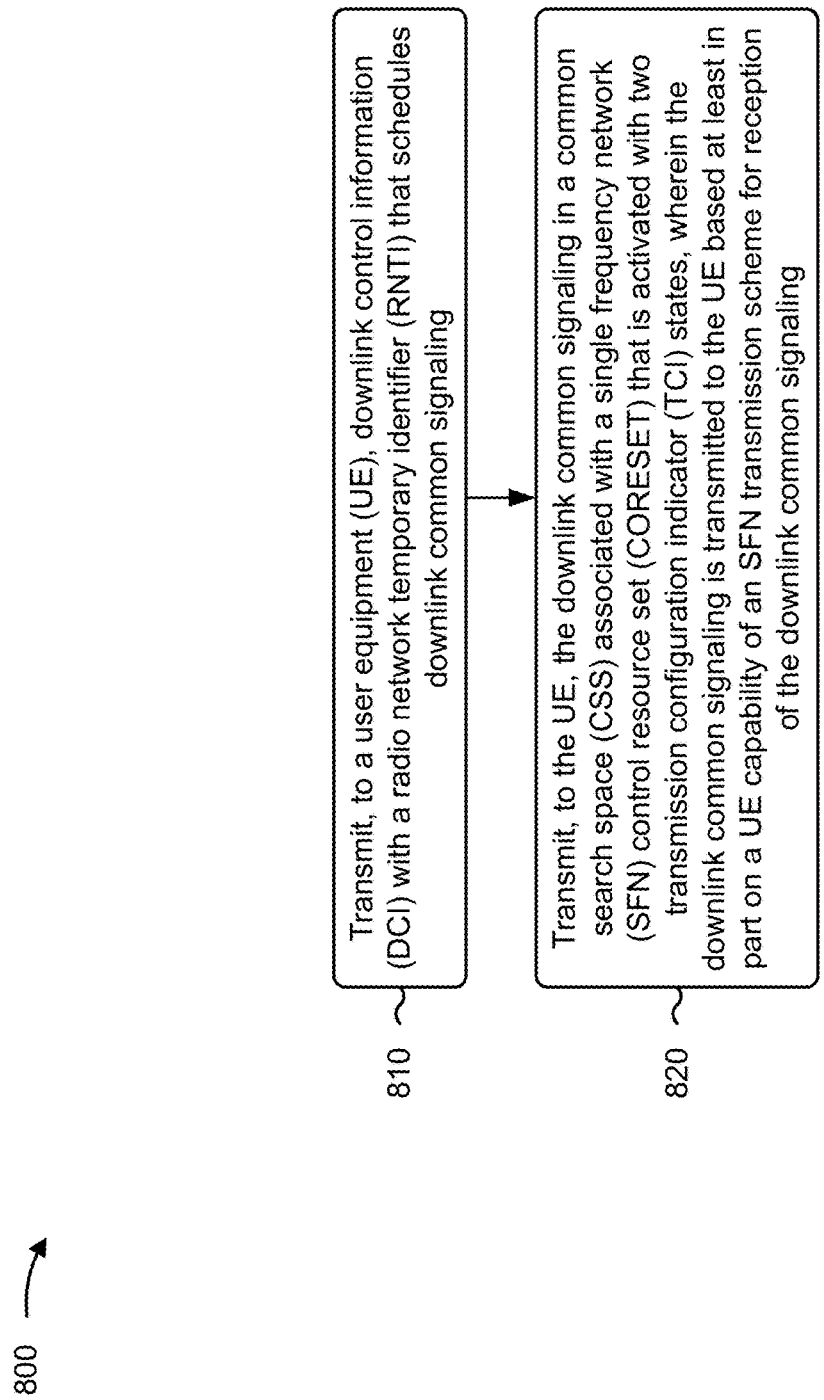

FIG. 8 is a diagram illustrating an example process 800 performed, for example, by a TRP, in accordance with the present disclosure. Example process 800 is an example where the TRP (e.g., a network entity, such as base station 110) performs operations associated with downlink common signaling in an SFN transmission scheme.

As shown in FIG. 8, in some aspects, process 800 may include transmitting, to a UE, DCI with an RNTI that schedules downlink common signaling (block 810). For example, the TRP (e.g., using communication manager 150 and/or transmission component 1004, depicted in FIG. 10) may transmit, to a UE, DCI with an RNTI that schedules downlink common signaling, as described above in connection with FIGS. 4-6.

As further shown in FIG. 8, in some aspects, process 800 may include transmitting, to the UE, the downlink common signaling in a CSS associated with an SFN CORESET that is activated with two TCI states, wherein the downlink common signaling is transmitted to the UE based at least in part on a UE capability of an SFN transmission scheme for reception of the downlink common signaling (block 820). For example, the TRP (e.g., using communication manager 150 and/or transmission component 1004, depicted in FIG. 10) may transmit, to the UE, the downlink common signaling in a CSS associated with an SFN CORESET that is activated with two TCI states, wherein the downlink common signaling is transmitted to the UE based at least in part on a UE capability of an SFN transmission scheme for reception of the downlink common signaling, as described above in connection with FIGS. 4-6.

Process 800 may include additional aspects, such as any single aspect or any combination of aspects described below and/or in connection with one or more other processes described elsewhere herein.

In a first aspect, the SFN CORESET is associated with an RRC parameter that indicates a first SFN transmission scheme or a second SFN transmission scheme.

In a second aspect, alone or in combination with the first aspect, the second SFN transmission scheme is not applicable to the downlink common signaling based at least in part on a frequency pre-compensation associated with the second SFN transmission scheme and different frequencies associated with different UEs.

In a third aspect, alone or in combination with one or more of the first and second aspects, the downlink common signaling is associated with a PDCCH, the CSS is a CSS type 0/0A/2, the RNTI is an SI-RNTI or a P-RNTI, and the DCI schedules a PDSCH for a SIB or paging.

In a fourth aspect, alone or in combination with one or more of the first through third aspects, the UE capability indicates that the UE does not support an SFN PDCCH reception in the CSS type 0/0A/2, and transmitting the downlink common signaling is based at least in part on an assumption of a single TRP PDCCH transmission with a single TCI state.

In a fifth aspect, alone or in combination with one or more of the first through fourth aspects, the UE capability indicates that the UE supports the SFN PDCCH reception in the CSS type 0/0A/2, and transmitting the downlink common signaling is based at least in part on an assumption of an SFN PDCCH transmission with the two TCI states of the SFN CORESET.

In a sixth aspect, alone or in combination with one or more of the first through fifth aspects, the downlink common signaling is associated with a PDCCH, the CSS is a CSS type 1, the RNTI is an RA-RNTI or a TC-RNTI, and the DCI schedules a Message 2 or a Message 4 of a RACH procedure.

In a seventh aspect, alone or in combination with one or more of the first through sixth aspects, the UE capability indicates that the UE does not support an SFN PDCCH reception in the CSS type 1, and transmitting the downlink common signaling is based at least in part on an assumption of a single TRP PDCCH transmission with a single TCI state.

In an eighth aspect, alone or in combination with one or more of the first through seventh aspects, the UE capability indicates that the UE supports the SFN PDCCH reception in the CSS type 1, and transmitting the downlink common signaling is based at least in part on an assumption of an SFN PDCCH transmission with the two TCI states of the SFN CORESET.

In a ninth aspect, alone or in combination with one or more of the first through eighth aspects, the downlink common signaling is associated with a PDCCH, the CSS is a CSS type 3, and the DCI schedules a UE GC-PDCCH.

In a tenth aspect, alone or in combination with one or more of the first through ninth aspects, the UE capability indicates that the UE does not support an SFN GC-PDCCH reception in the CSS type 3, and transmitting the downlink common signaling is based at least in part on an assumption of a single TRP PDCCH transmission with a single TCI state.

In an eleventh aspect, alone or in combination with one or more of the first through tenth aspects, the UE capability indicates that the UE supports the SFN GC-PDCCH reception in the CSS type 3, and transmitting the downlink common signaling is based at least in part on an assumption of an SFN PDCCH transmission with the two TCI states of the SFN CORESET.

In a twelfth aspect, alone or in combination with one or more of the first through eleventh aspects, the downlink common signaling is associated with a PDCCH, and the RNTI is an SI-RNTI, a P-RNTI, an RA-RNTI, or a TC-RNTI, and process 800 includes transmitting, to the UE, an SSB or a CSI-RS based at least in part on the UE capability of the SFN transmission scheme.

In a thirteenth aspect, alone or in combination with one or more of the first through twelfth aspects, process 800 includes transmitting the SSB or a CSI-RS based at least in part on the UE capability of not supporting the SFN transmission scheme, wherein the TRP is mapped to a single TCI state of the SFN CORESET.

In a fourteenth aspect, alone or in combination with one or more of the first through thirteenth aspects, the downlink common signaling is associated with a PDSCH, and the RNTI is an SI-RNTI or a P-RNTI, and transmitting the downlink common signaling is based at least in part on an assumption that the PDSCH is transmitted in accordance with the SFN transmission scheme, and an assumption that a DMRS port of the PDSCH is quasi co-located with an associated SFN SSB or pair of SSBs, with respect to one or more of a Doppler shift, a Doppler spread, an average delay, a delay spread, or spatial receive parameters associated with the TRP.

In a fifteenth aspect, alone or in combination with one or more of the first through fourteenth aspects, the downlink common signaling is associated with a PDSCH, and the RNTI is an RA-RNTI or a Message B RNTI, and transmitting the downlink common signaling is based at least in part on an assumption that the PDSCH is transmitted in accordance with the SFN transmission scheme, and an assumption that a DMRS port of the PDSCH is quasi co-located with an associated SFN SSB or an SFN CSI-RS resource or a pair of SSBs or a pair of CSI-RSs resources that the UE used for a RACH transmission, with respect to one or more of a Doppler shift, a Doppler spread, an average delay, a delay spread, or spatial receive parameters associated with the TRP.

In a sixteenth aspect, alone or in combination with one or more of the first through fifteenth aspects, process 800 includes transmitting a PDSCH based at least in part on a PUSCH transmission scheduled by a RAR uplink grant or a corresponding PUSCH retransmission, or transmitting a PDSCH based at least in part on a PUSCH for a Type-2 random access procedure, or a PUSCH scheduled by a fallback RAR uplink grant or a corresponding PUSCH retransmission.

In a seventeenth aspect, alone or in combination with one or more of the first through sixteenth aspects, transmitting the downlink common signaling is based at least in part on an assumption that the PDSCH is transmitted in accordance with the SFN transmission scheme, and an assumption that a DMRS port of the PDSCH is quasi co-located with an associated SFN SSB or a pair of SSBs that the UE used for a RACH transmission, with respect to one or more of a Doppler shift, a Doppler spread, an average delay, a delay spread, or spatial receive parameters associated with the TRP.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
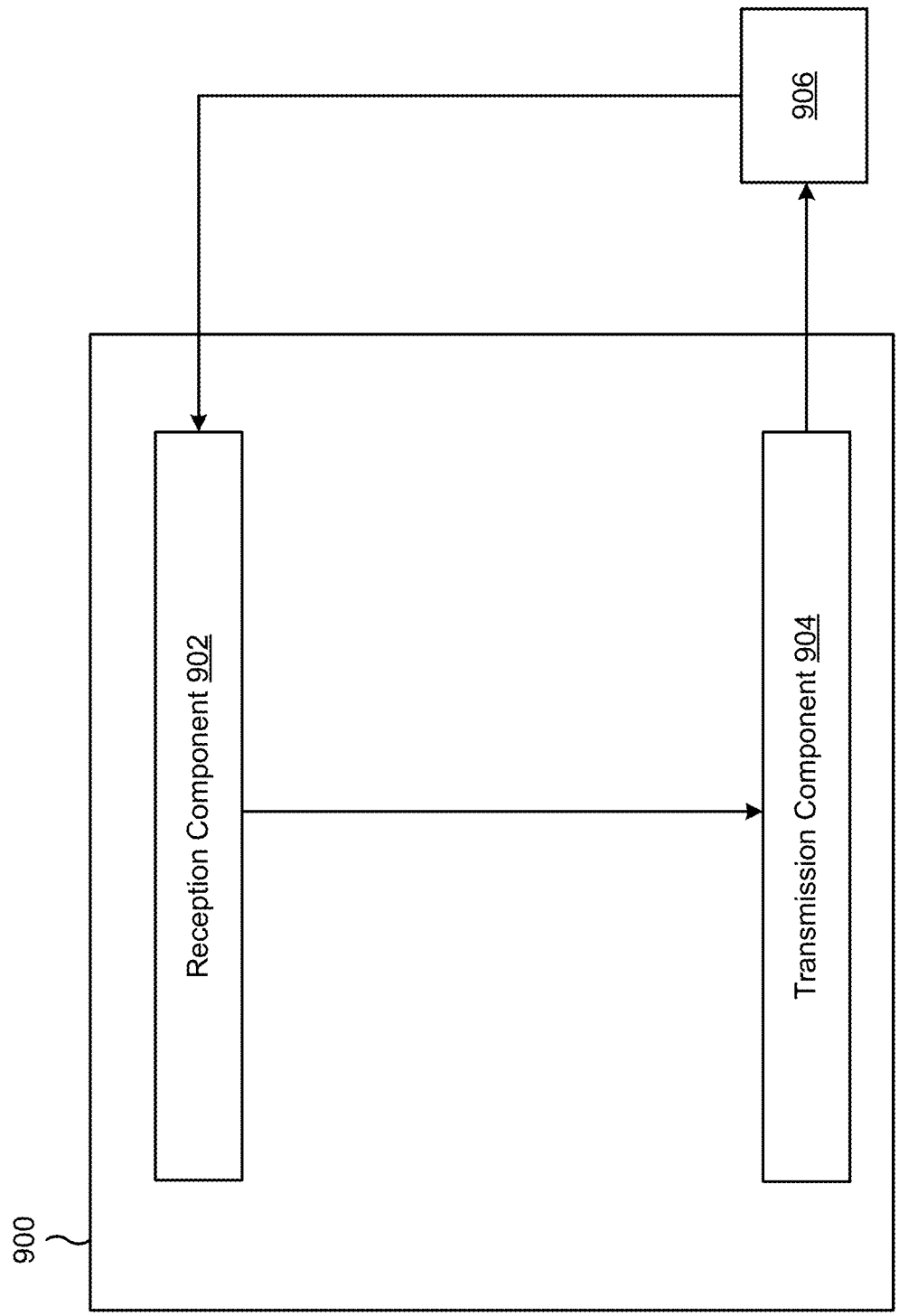
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 4-7. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a first TRP and a second TRP, DCI with an RNTI that schedules downlink common signaling. The reception component 902 may receive, from one or more of the first TRP or the second TRP based at least in part on the DCI, the downlink common signaling in a CSS associated with an SFN CORESET that is activated with two TCI states, wherein the downlink common signaling is received from one or more of the first TRP or the second TRP based at least in part on a UE capability of an SFN transmission scheme for reception of the downlink common signaling.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
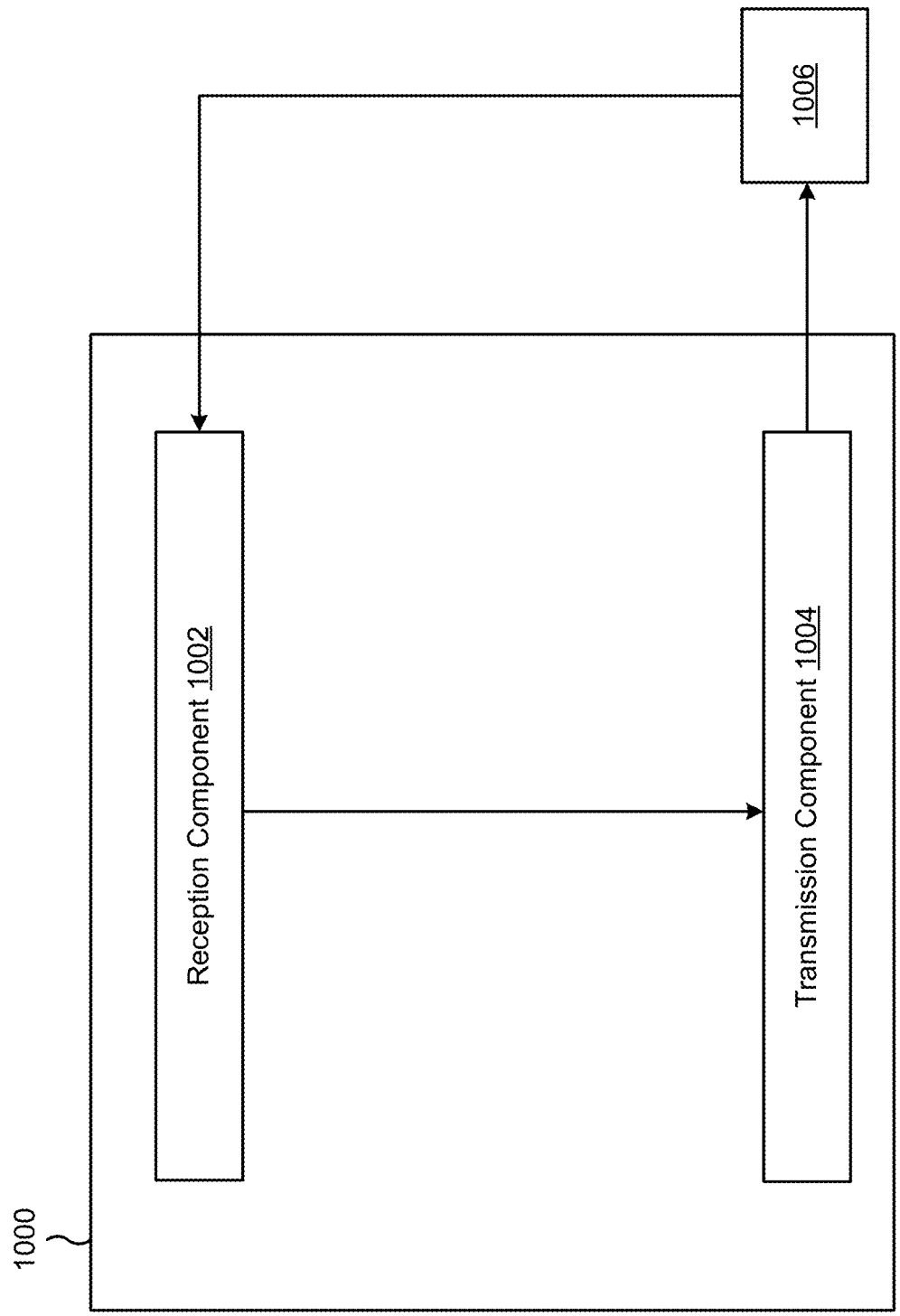

FIG. 10 is a diagram of an example apparatus 1000 for wireless communication. The apparatus 1000 may be a TRP, or a TRP may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the TRP described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the TRP described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the TRP described in connection with FIG. 2. In some aspects, the transmission component 1004 may be co-located with the reception component 1002 in a transceiver.

The transmission component 1004 may transmit, to a UE, DCI with an RNTI that schedules downlink common signaling. The transmission component 1004 may transmit, to the UE, the downlink common signaling in a CSS associated with an SFN CORESET that is activated with two TCI states, wherein the downlink common signaling is transmitted to the UE based at least in part on a UE capability of an SFN transmission scheme for reception of the downlink common signaling.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
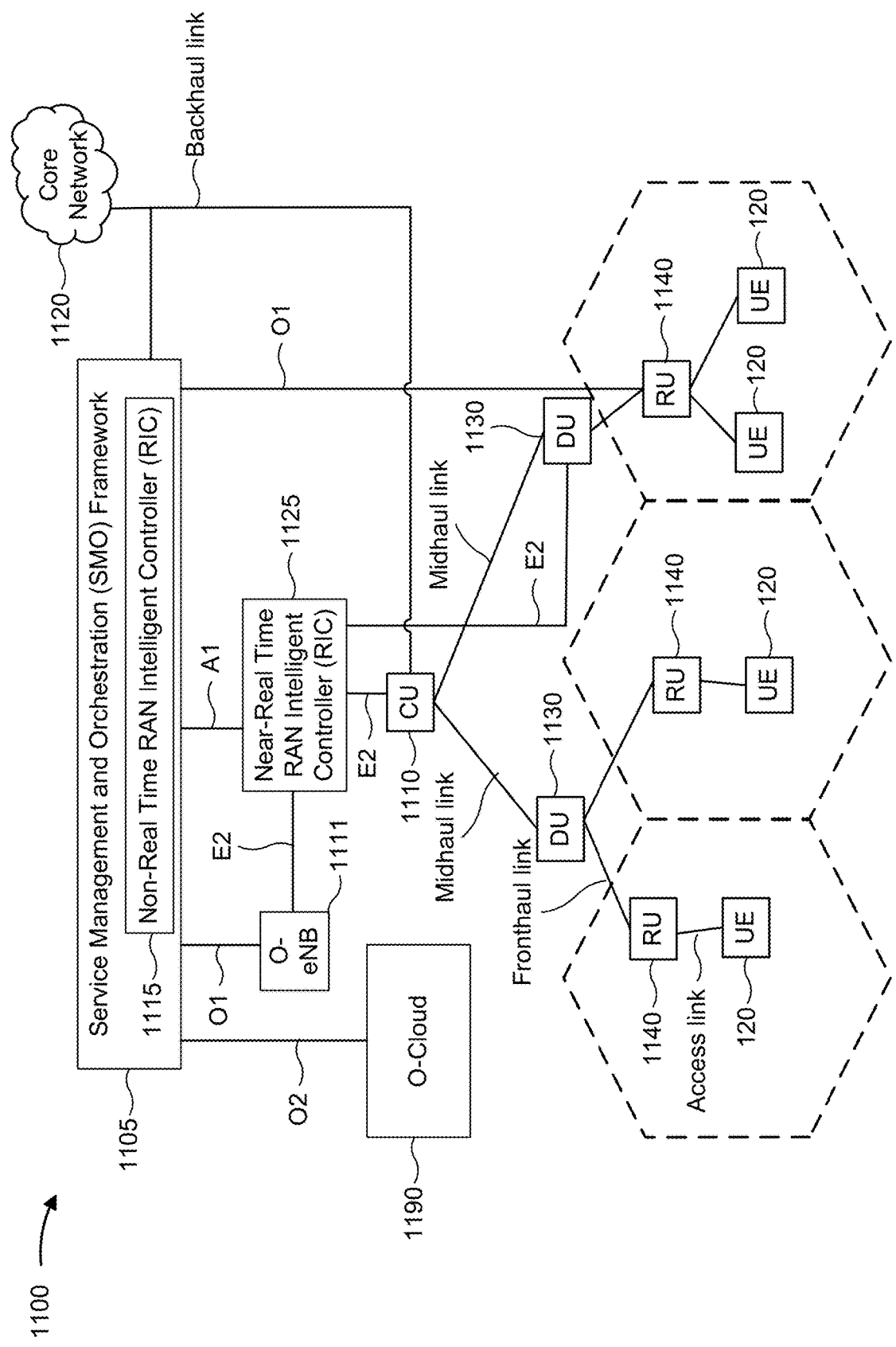
FIG. 11 is a diagram illustrating an example of a disaggregated base station architecture, in accordance with the present disclosure.

FIG. 11 is a diagram illustrating an example 1100 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 11 may include one or more CUs 1110 that can communicate directly with a core network 1120 via a backhaul link, or indirectly with the core network 1120 through one or more disaggregated base station units (such as a Near-RT RIC 1125 via an E2 link, or a Non-RT RIC 1115 associated with a Service Management and Orchestration (SMO) Framework 1105, or both). A CU 1110 may communicate with one or more DUs 1130 via respective midhaul links, such as an F1 interface. The DUs 1130 may communicate with one or more RUs 1140 via respective fronthaul links. The RUs 1140 may communicate with respective UEs 120 via one or more radio frequency (RF) access links. In some implementations, the UE 120 may be simultaneously served by multiple RUs 1140.

Each of the units (e.g., the CUs 1110, the DUs 1130, the RUs 1140), as well as the Near-RT RICs 1125, the Non-RT RICs 1115, and the SMO Framework 1105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1110. The CU 1110 may be configured to handle user plane functionality (e.g., Central Unit-User Plane (CU-UP)), control plane functionality (e.g., Central Unit-Control Plane (CU-CP)), or a combination thereof. In some implementations, the CU 1110 can be logically split into one or more CU-UP units and one or more CU-CP units. The CU-UP unit can communicate bidirectionally with the CU-CP unit via an interface, such as the E1 interface when implemented in an O-RAN configuration. The CU 1110 can be implemented to communicate with the DU 1130, as necessary, for network control and signaling.

The DU 1130 may correspond to a logical unit that includes one or more base station functions to control the operation of one or more RUs 1140. In some aspects, the DU 1130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1130 may further host one or more low-PHY layers. Each layer (or module) can be implemented with an interface configured to communicate signals with other layers (and modules) hosted by the DU 1130, or with the control functions hosted by the CU 1110.

Lower-layer functionality can be implemented by one or more RUs 1140. In some deployments, an RU 1140, controlled by a DU 1130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1140 can be implemented to handle over the air (OTA) communication with one or more UEs 120. In some implementations, real-time and non-real-time aspects of control and user plane communication with the RU(s) 1140 can be controlled by the corresponding DU 1130. In some scenarios, this configuration can enable the DU(s) 1130 and the CU 1110 to be implemented in a cloud-based RAN architecture, such as a vRAN architecture.

The SMO Framework 1105 may be configured to support RAN deployment and provisioning of non-virtualized and virtualized network elements. For non-virtualized network elements, the SMO Framework 1105 may be configured to support the deployment of dedicated physical resources for RAN coverage requirements which may be managed via an operations and maintenance interface (such as an O1 interface). For virtualized network elements, the SMO Framework 1105 may be configured to interact with a cloud computing platform (such as an open cloud (O-Cloud) 1190) to perform network element life cycle management (such as to instantiate virtualized network elements) via a cloud computing platform interface (such as an O2 interface). Such virtualized network elements can include, but are not limited to, CUs 1110, DUs 1130, RUs 1140 and Near-RT RICs 1125. In some implementations, the SMO Framework 1105 can communicate with a hardware aspect of a 4G RAN, such as an open eNB (O-eNB) 1111, via an O1 interface. Additionally, in some implementations, the SMO Framework 1105 can communicate directly with one or more RUs 1140 via an O1 interface. The SMO Framework 1105 also may include a Non-RT RIC 1115 configured to support functionality of the SMO Framework 1105.

The Non-RT RIC 1115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1125. The Non-RT RIC 1115 may be coupled to or communicate with (such as via an A1 interface) the Near-RT RIC 1125. The Near-RT RIC 1125 may be configured to include a logical function that enables near-real-time control and optimization of RAN elements and resources via data collection and actions over an interface (such as via an E2 interface) connecting one or more CUs 1110, one or more DUs 1130, or both, as well as an O-eNB, with the Near-RT RIC 1125.

In some implementations, to generate AI/ML models to be deployed in the Near-RT RIC 1125, the Non-RT RIC 1115 may receive parameters or external enrichment information from external servers. Such information may be utilized by the Near-RT RIC 1125 and may be received at the SMO Framework 1105 or the Non-RT RIC 1115 from non-network data sources or from network functions. In some examples, the Non-RT RIC 1115 or the Near-RT RIC 1125 may be configured to tune RAN behavior or performance. For example, the Non-RT RIC 1115 may monitor long-term trends and patterns for performance and employ AI/ML models to perform corrective actions through the SMO Framework 1105 (such as reconfiguration via O1) or via creation of RAN management policies (such as A1 policies).

As indicated above, FIG. 11 is provided as an example. Other examples may differ from what is described with regard to FIG. 11.

The following provides an overview of some Aspects of the present disclosure:

Aspect 1: A method of wireless communication performed by a user equipment (UE), comprising: receiving, from a first transmit-receive point (TRP) and a second TRP, downlink control information (DCI) with a radio network temporary identifier (RNTI) that schedules downlink common signaling; and receiving, from one or more of the first TRP or the second TRP based at least in part on the DCI, the downlink common signaling in a common search space (CSS) associated with a single frequency network (SFN) control resource set (CORESET) that is activated with two transmission configuration indicator (TCI) states, wherein the downlink common signaling is received from one or more of the first TRP or the second TRP based at least in part on a UE capability of an SFN transmission scheme for reception of the downlink common signaling.

Aspect 2: The method of Aspect 1, wherein the SFN CORESET is associated with a radio resource control (RRC) parameter that indicates a first SFN transmission scheme or a second SFN transmission scheme.

Aspect 3: The method of Aspect 2, wherein the second SFN transmission scheme is not applicable to the downlink common signaling based at least in part on a frequency pre-compensation associated with the second SFN transmission scheme and different frequencies associated with different UEs.

Aspect 4: The method of any of Aspects 1 through 3, wherein the downlink common signaling is associated with a physical downlink control channel (PDCCH), the CSS is a CSS type 0/0A/2, the RNTI is a system information RNTI or a paging RNTI, and the DCI schedules a physical downlink shared channel for a system information block or paging.

Aspect 5: The method of Aspect 4, wherein the UE capability indicates that the UE does not support an SFN PDCCH reception in the CSS type 0/0A/2, and receiving the downlink common signaling is based at least in part on an assumption of a single TRP PDCCH transmission with a single TCI state.

Aspect 6: The method of Aspect 4, wherein the UE capability indicates that the UE supports the SFN PDCCH reception in the CSS type 0/0A/2, and receiving the downlink common signaling is based at least in part on an assumption of an SFN PDCCH transmission with the two TCI states of the SFN CORESET.

Aspect 7: The method of any of Aspects 1 through 6, wherein the downlink common signaling is associated with a physical downlink control channel (PDCCH), the CSS is a CSS type 1, the RNTI is a random access RNTI or a temporary cell RNTI, and the DCI schedules a Message 2 or a Message 4 of a random access channel procedure.

Aspect 8: The method of Aspect 7, wherein the UE capability indicates that the UE does not support an SFN PDCCH reception in the CSS type 1, and receiving the downlink common signaling is based at least in part on an assumption of a single TRP PDCCH transmission with a single TCI state.

Aspect 9: The method of Aspect 7, wherein the UE capability indicates that the UE supports the SFN PDCCH reception in the CSS type 1, and receiving the downlink common signaling is based at least in part on an assumption of an SFN PDCCH transmission with the two TCI states of the SFN CORESET.

Aspect 10: The method of any of Aspects 1 through 9, wherein the downlink common signaling is associated with a physical downlink control channel (PDCCH), the CSS is a CSS type 3, and the DCI schedules a UE group common (GC)-PDCCH.

Aspect 11: The method of Aspect 10, wherein the UE capability indicates that the UE does not support an SFN GC-PDCCH reception in the CSS type 3, and receiving the downlink common signaling is based at least in part on an assumption of a single TRP PDCCH transmission with a single TCI state.

Aspect 12: The method of Aspect 10, wherein the UE capability indicates that the UE supports the SFN GC-PDCCH reception in the CSS type 3, and receiving the downlink common signaling is based at least in part on an assumption of an SFN PDCCH transmission with the two TCI states of the SFN CORESET.

Aspect 13: The method of any of Aspects 1 through 12, wherein the downlink common signaling is associated with a physical downlink control channel (PDCCH), and the RNTI is a system information RNTI, a paging RNTI, a random access RNTI, or a temporary cell RNTI, and further comprising receiving, from one or more of the first TRP or the second TRP, a synchronization signal block (SSB) or a channel state information reference signal (CSI-RS) based at least in part on the UE capability of the SFN transmission scheme.

Aspect 14: The method of Aspect 13, wherein receiving the SSB comprises receiving the SSB from both the first TRP and the second TRP based at least in part on the UE capability supporting the SFN transmission scheme.

Aspect 15: The method of Aspect 13, wherein receiving the SSB comprises receiving the SSB or a channel state information reference signal from the first TRP or the second TRP based at least in part on the UE capability of not supporting the SFN transmission scheme, wherein the first TRP or the second TRP is mapped to a single TCI state of the SFN CORESET.

Aspect 16: The method of Aspect 13, wherein receiving the SSB or the CSI-RS comprises receiving a pair of SSBs or a pair of CSI-RSs, wherein a first SSB or a first CSI-RS is received from the first TRP and a second SSB or a second CSI-RS is received from the second TRP based at least in part on the UE capability supporting the SFN transmission scheme associated with the pair of SSBs or the pair of CSI-RSs.

Aspect 17: The method of any of Aspects 1 through 16, wherein the downlink common signaling is associated with a physical downlink shared channel (PDSCH), and the RNTI is a system information RNTI or a paging RNTI, and wherein receiving the downlink common signaling is based at least in part on: an assumption that the PDSCH is transmitted by both the first TRP and the second TRP in accordance with the SFN transmission scheme, and an assumption that a demodulation reference signal port of the PDSCH is quasi co-located with an associated SFN synchronization signal block (SSB) or pair of SSBs, with respect to one or more of a Doppler shift, a Doppler spread, an average delay, a delay spread, or spatial receive parameters associated with each of the first TRP and the second TRP.

Aspect 18: The method of any of Aspects 1 through 17, wherein the downlink common signaling is associated with a physical downlink shared channel (PDSCH), and the RNTI is a random access RNTI or a Message B RNTI, and wherein receiving the downlink common signaling is based at least in part on: an assumption that the PDSCH is transmitted by both the first TRP and the second TRP in accordance with the SFN transmission scheme, and an assumption that a demodulation reference signal port of the PDSCH is quasi co-located with an associated SFN synchronization signal block (SSB) or an SFN channel state information reference signal (CSI-RS) resource or a pair of SSBs or a pair of CSI-RSs resources that the UE used for a random access channel transmission, with respect to one or more of a Doppler shift, a Doppler spread, an average delay, a delay spread, or spatial receive parameters associated with each of the first TRP and the second TRP.

Aspect 19: The method of any of Aspects 1 through 18, wherein receiving the downlink common signaling comprises: receiving a physical downlink shared channel (PDSCH) based at least in part on a physical uplink shared channel (PUSCH) transmission scheduled by a random access response (RAR) uplink grant or a corresponding PUSCH retransmission; or receiving a PDSCH based at least in part on a PUSCH for a Type-2 random access procedure, or a PUSCH scheduled by a fallback RAR uplink grant or a corresponding PUSCH retransmission.

Aspect 20: The method of Aspect 19, wherein receiving the downlink common signaling is based at least in part on: an assumption that the PDSCH is transmitted by both the first TRP and the second TRP in accordance with the SFN transmission scheme, and an assumption that a demodulation reference signal port of the PDSCH is quasi co-located with an associated SFN synchronization signal block (SSB) or a pair of SSBs that the UE used for a random access channel transmission, with respect to one or more of a Doppler shift, a Doppler spread, an average delay, a delay spread, or spatial receive parameters associated with each of the first TRP and the second TRP.

Aspect 21: A method of wireless communication performed by a transmit-receive point (TRP), comprising: transmitting, to a user equipment (UE), downlink control information (DCI) with a radio network temporary identifier (RNTI) that schedules downlink common signaling; and transmitting, to the UE, the downlink common signaling in a common search space (CSS) associated with a single frequency network (SFN) control resource set (CORESET) that is activated with two transmission configuration indicator (TCI) states, wherein the downlink common signaling is transmitted to the UE based at least in part on a UE capability of an SFN transmission scheme for reception of the downlink common signaling.

Aspect 22: The method of Aspect 21, wherein the SFN CORESET is associated with a radio resource control (RRC) parameter that indicates a first SFN transmission scheme or a second SFN transmission scheme.

Aspect 23: The method of Aspect 22, wherein the second SFN transmission scheme is not applicable to the downlink common signaling based at least in part on a frequency pre-compensation associated with the second SFN transmission scheme and different frequencies associated with different UEs.

Aspect 24: The method of any of Aspects 21 through 23, wherein the downlink common signaling is associated with a physical downlink control channel (PDCCH), the CSS is a CSS type 0/0A/2, the RNTI is a system information RNTI or a paging RNTI, and the DCI schedules a physical downlink shared channel for a system information block or paging.

Aspect 25: The method of Aspect 24, wherein the UE capability indicates that the UE does not support an SFN PDCCH reception in the CSS type 0/0A/2, and transmitting the downlink common signaling is based at least in part on an assumption of a single TRP PDCCH transmission with a single TCI state.

Aspect 26: The method of Aspect 24, wherein the UE capability indicates that the UE supports the SFN PDCCH reception in the CSS type 0/0A/2, and transmitting the downlink common signaling is based at least in part on an assumption of an SFN PDCCH transmission with the two TCI states of the SFN CORESET.

Aspect 27: The method of any of Aspects 21 through 26, wherein the downlink common signaling is associated with a physical downlink control channel (PDCCH), the CSS is a CSS type 1, the RNTI is a random access RNTI or a temporary cell RNTI, and the DCI schedules a Message 2 or a Message 4 of a random access channel procedure.

Aspect 28: The method of Aspect 27, wherein the UE capability indicates that the UE does not support an SFN PDCCH reception in the CSS type 1, and transmitting the downlink common signaling is based at least in part on an assumption of a single TRP PDCCH transmission with a single TCI state.

Aspect 29: The method of Aspect 27, wherein the UE capability indicates that the UE supports the SFN PDCCH reception in the CSS type 1, and transmitting the downlink common signaling is based at least in part on an assumption of an SFN PDCCH transmission with the two TCI states of the SFN CORESET.

Aspect 30: The method of any of Aspects 21 through 29, wherein the downlink common signaling is associated with a physical downlink control channel (PDCCH), the CSS is a CSS type 3, and the DCI schedules a UE group common (GC)-PDCCH.

Aspect 31: The method of Aspect 30, wherein the UE capability indicates that the UE does not support an SFN GC-PDCCH reception in the CSS type 3, and transmitting the downlink common signaling is based at least in part on an assumption of a single TRP PDCCH transmission with a single TCI state.

Aspect 32: The method of Aspect 30, wherein the UE capability indicates that the UE supports the SFN GC-PDCCH reception in the CSS type 3, and transmitting the downlink common signaling is based at least in part on an assumption of an SFN PDCCH transmission with the two TCI states of the SFN CORESET.

Aspect 33: The method of any of Aspects 21 through 32, wherein the downlink common signaling is associated with a physical downlink control channel (PDCCH), and the RNTI is a system information RNTI, a paging RNTI, a random access RNTI, or a temporary cell RNTI, and further comprising transmitting, to the UE, a synchronization signal block (SSB) or a channel state information reference signal based at least in part on the UE capability of the SFN transmission scheme.

Aspect 34: The method of Aspect 33, wherein transmitting the SSB comprises transmitting the SSB or a channel state information reference signal based at least in part on the UE capability of not supporting the SFN transmission scheme, wherein the TRP is mapped to a single TCI state of the SFN CORESET.

Aspect 35: The method of any of Aspects 21 through 34, wherein the downlink common signaling is associated with a physical downlink shared channel (PDSCH), and the RNTI is a system information RNTI or a paging RNTI, and wherein transmitting the downlink common signaling is based at least in part on: an assumption that the PDSCH is transmitted in accordance with the SFN transmission scheme, and an assumption that a demodulation reference signal port of the PDSCH is quasi co-located with an associated SFN synchronization signal block (SSB) or pair of SSBs, with respect to one or more of a Doppler shift, a Doppler spread, an average delay, a delay spread, or spatial receive parameters associated with the TRP.

Aspect 36: The method of any of Aspects 21 through 35, wherein the downlink common signaling is associated with a physical downlink shared channel (PDSCH), and the RNTI is a random access RNTI or a Message B RNTI, and wherein transmitting the downlink common signaling is based at least in part on: an assumption that the PDSCH is transmitted in accordance with the SFN transmission scheme, and an assumption that a demodulation reference signal port of the PDSCH is quasi co-located with an associated SFN synchronization signal block (SSB) or an SFN channel state information reference signal (CSI-RS) resource or a pair of SSBs or a pair of CSI-RSs resources that the UE used for a random access channel transmission, with respect to one or more of a Doppler shift, a Doppler spread, an average delay, a delay spread, or spatial receive parameters associated with the TRP.

Aspect 37: The method of any of Aspects 21 through 36, wherein transmitting the downlink common signaling comprises: transmitting a physical downlink shared channel (PDSCH) based at least in part on a physical uplink shared channel (PUSCH) transmission scheduled by a random access response (RAR) uplink grant or a corresponding PUSCH retransmission; or transmitting a PDSCH based at least in part on a PUSCH for a Type-2 random access procedure, or a PUSCH scheduled by a fallback RAR uplink grant or a corresponding PUSCH retransmission.

Aspect 38: The method of Aspect 37, wherein transmitting the downlink common signaling is based at least in part on: an assumption that the PDSCH is transmitted in accordance with the SFN transmission scheme, and an assumption that a demodulation reference signal port of the PDSCH is quasi co-located with an associated SFN synchronization signal block (SSB) or a pair of SSBs that the UE used for a random access channel transmission, with respect to one or more of a Doppler shift, a Doppler spread, an average delay, a delay spread, or spatial receive parameters associated with the TRP.

Aspect 39: An apparatus for wireless communication at a device, comprising a processor; memory coupled with the processor; and instructions stored in the memory and executable by the processor to cause the apparatus to perform the method of one or more of Aspects 1-20.

Aspect 40: A device for wireless communication, comprising a memory and one or more processors coupled to the memory, the one or more processors configured to perform the method of one or more of Aspects 1-20.

Aspect 41: An apparatus for wireless communication, comprising at least one means for performing the method of one or more of Aspects 1-20.

Aspect 42: A non-transitory computer-readable medium storing code for wireless communication, the code comprising instructions executable by a processor to perform the method of one or more of Aspects 1-20.

Aspect 43: A non-transitory computer-readable medium storing a set of instructions for wireless communication, the set of instructions comprising one or more instructions that, when executed by one or more processors of a device, cause the device to perform the method of one or more of Aspects 1-20.

Aspect 44: An apparatus for wireless communication at a device, comprising a processor; memory coupled with the processor; and instructions stored in the memory and executable by the processor to cause the apparatus to perform the method of one or more of Aspects 21-38.

Aspect 45: A device for wireless communication, comprising a memory and one or more processors coupled to the memory, the one or more processors configured to perform the method of one or more of Aspects 21-38.

Aspect 46: An apparatus for wireless communication, comprising at least one means for performing the method of one or more of Aspects 21-38.

Aspect 47: A non-transitory computer-readable medium storing code for wireless communication, the code comprising instructions executable by a processor to perform the method of one or more of Aspects 21-38.

Aspect 48: A non-transitory computer-readable medium storing a set of instructions for wireless communication, the set of instructions comprising one or more instructions that, when executed by one or more processors of a device, cause the device to perform the method of one or more of Aspects 21-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive, from a first transmit-receive point (TRP) and a second TRP, downlink control information (DCI) with a radio network temporary identifier (RNTI) that schedules downlink common signaling; and
      receive, from one or more of the first TRP or the second TRP based at least in part on the DCI, the downlink common signaling in a common search space (CSS) associated with a single frequency network (SFN) control resource set (CORESET) that is activated with two transmission configuration indicator (TCI) states, wherein the downlink common signaling is received from one or more of the first TRP or the second TRP based at least in part on a UE capability of an SFN transmission scheme for reception of the downlink common signaling.

2. The apparatus of claim 1, wherein the SFN CORESET is associated with a radio resource control (RRC) parameter that indicates a first SFN transmission scheme or a second SFN transmission scheme, wherein the second SFN transmission scheme is not applicable to the downlink common signaling based at least in part on a frequency pre-compensation associated with the second SFN transmission scheme and different frequencies associated with different UEs.

3. The apparatus of claim 1, wherein the downlink common signaling is associated with a physical downlink control channel (PDCCH), the CSS is a CSS type 0/0A/2, the RNTI is a system information RNTI or a paging RNTI, and the DCI schedules a physical downlink shared channel for a system information block or paging.

4. The apparatus of claim 3, wherein:
   the UE capability indicates, based at least in part on a UE capability report, that the UE does not support an SFN PDCCH reception in the CSS type 0/0A/2, and the one or more processors are configured to receive the downlink common signaling based at least in part on an assumption of a single TRP PDCCH transmission with a single TCI state; or
   the UE capability indicates, based at least in part on the UE capability report, that the UE supports the SFN PDCCH reception in the CSS type 0/0A/2, and the one or more processors are configured to receive the downlink common signaling based at least in part on an assumption of an SFN PDCCH transmission with the two TCI states of the SFN CORESET, as indicated by the UE capability report.

5. The apparatus of claim 1, wherein the downlink common signaling is associated with a physical downlink control channel (PDCCH), the CSS is a CSS type 1, the RNTI is a random access RNTI or a temporary cell RNTI, and the DCI schedules a Message 2 or a Message 4 of a random access channel procedure.

6. The apparatus of claim 5, wherein:
   the UE capability indicates, based at least in part on a UE capability report, that the UE does not support an SFN PDCCH reception in the CSS type 1, and the one or more processors are configured to receive the downlink common signaling based at least in part on an assumption of a single TRP PDCCH transmission with a single TCI state; or
   the UE capability indicates, based at least in part on the UE capability report, that the UE supports the SFN PDCCH reception in the CSS type 1, and the one or more processors are configured to receive the downlink common signaling based at least in part on an assumption of an SFN PDCCH transmission with the two TCI states of the SFN CORESET, as indicated by the UE capability report.

7. The apparatus of claim 1, wherein the downlink common signaling is associated with a physical downlink control channel (PDCCH), the CSS is a CSS type 3, and the DCI schedules a UE group common (GC)-PDCCH.

8. The apparatus of claim 7, wherein:
the UE capability indicates that the UE does not support an SFN GC-PDCCH reception in the CSS type 3, and the one or more processors are configured to receive the downlink common signaling based at least in part on an assumption of a single TRP PDCCH transmission with a single TCI state; or
the UE capability indicates that the UE supports the SFN GC-PDCCH reception in the CSS type 3, and the one or more processors are configured to receive the downlink common signaling based at least in part on an assumption of an SFN PDCCH transmission with the two TCI states of the SFN CORESET.

9. The apparatus of claim 1, wherein the downlink common signaling is associated with a physical downlink control channel (PDCCH), and the RNTI is a system information RNTI, a paging RNTI, a random access RNTI, or a temporary cell RNTI, and wherein the one or more processors are further configured to receive, from one or more of the first TRP or the second TRP, a synchronization signal block (SSB) or a channel state information reference signal (CSI-RS) based at least in part on the UE capability of the SFN transmission scheme.

10. The apparatus of claim 9, wherein the one or more processors, to receive the SSB, are configured to:
receive the SSB from both the first TRP and the second TRP based at least in part on the UE capability supporting the SFN transmission scheme; or
receive the SSB or the CSI-RS from the first TRP or the second TRP based at least in part on the UE capability of not supporting the SFN transmission scheme, wherein the first TRP or the second TRP is mapped to a single TCI state of the SFN CORESET.

11. The apparatus of claim 9, wherein the one or more processors, to receive the SSB or the CSI-RS, are configured to receive a pair of SSBs or a pair of CSI-RSs, wherein a first SSB or a first CSI-RS is received from the first TRP and a second SSB or a second CSI-RS is received from the second TRP based at least in part on the UE capability supporting the SFN transmission scheme associated with the pair of SSBs or the pair of CSI-RSs.

12. The apparatus of claim 1, wherein the downlink common signaling is associated with a physical downlink shared channel (PDSCH), and the RNTI is a system information RNTI or a paging RNTI, and the one or more processors are configured to receive the downlink common signaling based at least in part on: an assumption that the PDSCH is transmitted by both the first TRP and the second TRP in accordance with the SFN transmission scheme, and an assumption that a demodulation reference signal port of the PDSCH is quasi co-located with an associated SFN synchronization signal block (SSB) or pair of SSBs, with respect to one or more of a Doppler shift, a Doppler spread, an average delay, a delay spread, or spatial receive parameters associated with each of the first TRP and the second TRP.

13. The apparatus of claim 1, wherein the downlink common signaling is associated with a physical downlink shared channel (PDSCH), and the RNTI is a random access RNTI or a Message B RNTI, and the one or more processors are configured to receive the downlink common signaling based at least in part on: an assumption that the PDSCH is transmitted by both the first TRP and the second TRP in accordance with the SFN transmission scheme, and an assumption that a demodulation reference signal port of the PDSCH is quasi co-located with an associated SFN synchronization signal block (SSB) or an SFN channel state information reference signal (CSI-RS) resource or a pair of SSBs or a pair of CSI-RSs resources that the UE used for a random access channel transmission, with respect to one or more of a Doppler shift, a Doppler spread, an average delay, a delay spread, or spatial receive parameters associated with each of the first TRP and the second TRP.

14. The apparatus of claim 1, wherein the one or more processors, to receive the downlink common signaling, are configured to:
receive a physical downlink shared channel (PDSCH) based at least in part on a physical uplink shared channel (PUSCH) transmission scheduled by a random access response (RAR) uplink grant or a corresponding PUSCH retransmission; or
receive a PDSCH based at least in part on a PUSCH for a Type-2 random access procedure, or a PUSCH scheduled by a fallback RAR uplink grant or a corresponding PUSCH retransmission,
wherein the one or more processors are configured to receive the downlink common signaling based at least in part on: an assumption that the PDSCH is transmitted by both the first TRP and the second TRP in accordance with the SFN transmission scheme, and an assumption that a demodulation reference signal port of the PDSCH is quasi co-located with an associated SFN synchronization signal block (SSB) or a pair of SSBs that the UE used for a random access channel transmission, with respect to one or more of a Doppler shift, a Doppler spread, an average delay, a delay spread, or spatial receive parameters associated with each of the first TRP and the second TRP.

15. An apparatus for wireless communication at a transmit-receive point (TRP), comprising:
a memory; and
one or more processors, coupled to the memory, configured to:
transmit, to a user equipment (UE), downlink control information (DCI) with a radio network temporary identifier (RNTI) that schedules downlink common signaling; and
transmit, to the UE, the downlink common signaling in a common search space (CSS) associated with a single frequency network (SFN) control resource set (CORESET) that is activated with two transmission configuration indicator (TCI) states, wherein the downlink common signaling is transmitted to the UE based at least in part on a UE capability of an SFN transmission scheme for reception of the downlink common signaling.

16. The apparatus of claim 15, wherein the SFN CORESET is associated with a radio resource control (RRC) parameter that indicates a first SFN transmission scheme or a second SFN transmission scheme, and wherein the second SFN transmission scheme is not applicable to the downlink common signaling based at least in part on a frequency pre-compensation associated with the second SFN transmission scheme and different frequencies associated with different UEs.

17. The apparatus of claim 15, wherein the downlink common signaling is associated with a physical downlink control channel (PDCCH), the CSS is a CSS type 0/0A/2, the RNTI is a system information RNTI or a paging RNTI, and the DCI schedules a physical downlink shared channel for a system information block or paging.

18. The apparatus of claim 17, wherein:
the UE capability indicates that the UE does not support an SFN PDCCH reception in the CSS type 0/0A/2, and the one or more processors are configured to transmit the downlink common signaling based at least in part on an assumption of a single TRP PDCCH transmission with a single TCI state; or
the UE capability indicates that the UE supports the SFN PDCCH reception in the CSS type 0/0A/2, and the one or more processors are configured to transmit the downlink common signaling based at least in part on an assumption of an SFN PDCCH transmission with the two TCI states of the SFN CORESET.

19. The apparatus of claim 15, wherein the downlink common signaling is associated with a physical downlink control channel (PDCCH), the CSS is a CSS type 1, the RNTI is a random access RNTI or a temporary cell RNTI, and the DCI schedules a Message 2 or a Message 4 of a random access channel procedure.

20. The apparatus of claim 19, wherein:
the UE capability indicates that the UE does not support an SFN PDCCH reception in the CSS type 1, and the one or more processors are configured to transmit the downlink common signaling based at least in part on an assumption of a single TRP PDCCH transmission with a single TCI state; or
the UE capability indicates that the UE supports the SFN PDCCH reception in the CSS type 1, and the one or more processors are configured to transmit the downlink common signaling based at least in part on an assumption of an SFN PDCCH transmission with the two TCI states of the SFN CORESET.

21. The apparatus of claim 15, wherein the downlink common signaling is associated with a physical downlink control channel (PDCCH), the CSS is a CSS type 3, and the DCI schedules a UE group common (GC)-PDCCH.

22. The apparatus of claim 21, wherein the UE capability indicates that the UE does not support an SFN GC-PDCCH reception in the CSS type 3, and the one or more processors are configured to transmit the downlink common signaling based at least in part on an assumption of a single TRP PDCCH transmission with a single TCI state.

23. The apparatus of claim 21, wherein the UE capability indicates that the UE supports the SFN GC-PDCCH reception in the CSS type 3, and the one or more processors are configured to transmit the downlink common signaling based at least in part on an assumption of an SFN PDCCH transmission with the two TCI states of the SFN CORESET.

24. The apparatus of claim 15, wherein the downlink common signaling is associated with a physical downlink control channel (PDCCH), and the RNTI is a system information RNTI, a paging RNTI, a random access RNTI, or a temporary cell RNTI, and wherein the one or more processors are further configured to transmit, to the UE, a synchronization signal block (SSB) or a channel state information reference signal based at least in part on the UE capability of the SFN transmission scheme.

25. The apparatus of claim 24, wherein the one or more processors, to transmit the SSB, are configured to transmit the SSB or a channel state information reference signal based at least in part on the UE capability of not supporting the SFN transmission scheme, wherein the TRP is mapped to a single TCI state of the SFN CORESET.

26. The apparatus of claim 15, wherein the downlink common signaling is associated with a physical downlink shared channel (PDSCH), and the RNTI is a system information RNTI or a paging RNTI, and the one or more processors are configured to transmit the downlink common signaling based at least in part on: an assumption that the PDSCH is transmitted in accordance with the SFN transmission scheme, and an assumption that a demodulation reference signal port of the PDSCH is quasi co-located with an associated SFN synchronization signal block (SSB) or pair of SSBs, with respect to one or more of a Doppler shift, a Doppler spread, an average delay, a delay spread, or spatial receive parameters associated with the TRP.

27. The apparatus of claim 15, wherein the downlink common signaling is associated with a physical downlink shared channel (PDSCH), and the RNTI is a random access RNTI or a Message B RNTI, and the one or more processors are configured to transmit the downlink common signaling based at least in part on: an assumption that the PDSCH is transmitted in accordance with the SFN transmission scheme, and an assumption that a demodulation reference signal port of the PDSCH is quasi co-located with an associated SFN synchronization signal block (SSB) or an SFN channel state information reference signal (CSI-RS) resource or a pair of SSBs or a pair of CSI-RSs resources that the UE used for a random access channel transmission, with respect to one or more of a Doppler shift, a Doppler spread, an average delay, a delay spread, or spatial receive parameters associated with the TRP.

28. The apparatus of claim 15, wherein the one or more processors, to transmit the downlink common signaling, are configured to:
transmit a physical downlink shared channel (PDSCH) based at least in part on a physical uplink shared channel (PUSCH) transmission scheduled by a random access response (RAR) uplink grant or a corresponding PUSCH retransmission; or
transmit a PDSCH based at least in part on a PUSCH for a Type-2 random access procedure, or a PUSCH scheduled by a fallback RAR uplink grant or a corresponding PUSCH retransmission,
wherein the one or more processors are configured to transmit the downlink common signaling based at least in part on: an assumption that the PDSCH is transmitted in accordance with the SFN transmission scheme, and an assumption that a demodulation reference signal port of the PDSCH is quasi co-located with an associated SFN synchronization signal block (SSB) or a pair of SSBs that the UE used for a random access channel transmission, with respect to one or more of a Doppler shift, a Doppler spread, an average delay, a delay spread, or spatial receive parameters associated with the TRP.

29. A method of wireless communication performed by a user equipment (UE), comprising:
receiving, from a first transmit-receive point (TRP) and a second TRP, downlink control information (DCI) with a radio network temporary identifier (RNTI) that schedules downlink common signaling; and
receiving, from one or more of the first TRP or the second TRP based at least in part on the DCI, the downlink common signaling in a common search space (CSS) associated with a single frequency network (SFN) control resource set (CORESET) that is activated with two transmission configuration indicator (TCI) states, wherein the downlink common signaling is received from one or more of the first TRP or the second TRP based at least in part on a UE capability of an SFN transmission scheme for reception of the downlink common signaling.

30. A method of wireless communication performed by a transmit-receive point (TRP), comprising:

transmitting, to a user equipment (UE), downlink control information (DCI) with a radio network temporary identifier (RNTI) that schedules downlink common signaling; and transmitting, to the UE, the downlink common signaling in a common search space (CSS) associated with a single frequency network (SFN) control resource set (CORESET) that is activated with two transmission configuration indicator (TCI) states, wherein the downlink common signaling is transmitted to the UE based at least in part on a UE capability of an SFN transmission scheme for reception of the downlink common signaling.

* * * * *